(12) United States Patent
Okamoto et al.

(10) Patent No.: US 8,192,771 B2
(45) Date of Patent: Jun. 5, 2012

(54) FERMENTED FOOD OR DRINK PRODUCT, AND METHOD FOR PRODUCING THE SAME

(75) Inventors: Takamitsu Okamoto, Nasushiobara (JP); Masahiko Takeda, Omiya (JP); Shigekazu Imayoshi, Nasushiobara (JP); Nobuhiro Yajima, Nasushiobara (JP)

(73) Assignee: Kagome Co., Ltd., Aichi (JP)

(*) Notice: Subject to any disclaimer, the term of this patent is extended or adjusted under 35 U.S.C. 154(b) by 160 days.

(21) Appl. No.: 12/451,721

(22) PCT Filed: May 16, 2008

(86) PCT No.: PCT/JP2008/059039
§ 371 (c)(1),
(2), (4) Date: Nov. 25, 2009

(87) PCT Pub. No.: WO2008/149654
PCT Pub. Date: Dec. 11, 2008

(65) Prior Publication Data
US 2010/0143541 A1    Jun. 10, 2010

(30) Foreign Application Priority Data

May 31, 2007    (JP) ................ P2007-145677

(51) Int. Cl.
*A23K 1/00*    (2006.01)
(52) U.S. Cl. .................. 426/52; 426/590; 426/635
(58) Field of Classification Search ............ 426/52, 426/590, 635
See application file for complete search history.

(56) References Cited

U.S. PATENT DOCUMENTS

| | | | | |
|---|---|---|---|---|
| 7,125,708 B2 * | 10/2006 | Wynne et al. | ............ | 435/252.9 |
| 7,501,274 B2 | 3/2009 | Nonaka et al. | | |
| 2005/0244559 A1 | 11/2005 | Kato et al. | | |
| 2007/0172549 A1 | 7/2007 | Okamoto et al. | | |
| 2009/0087418 A1 | 4/2009 | Strozzi et al. | | |
| 2011/0229603 A1 | 9/2011 | Suzuki et al. | | |

FOREIGN PATENT DOCUMENTS

| | | |
|---|---|---|
| CN | 1568365 A | 1/2005 |
| EP | 1 820 406 A1 | 8/2007 |
| EP | 1 854 469 A1 | 11/2007 |
| JP | 60-248131 | 12/1985 |
| JP | 62-239995 | 10/1987 |
| JP | 01-179646 | 7/1989 |
| JP | 01-247035 | 10/1989 |
| JP | 3-236741 | 10/1991 |
| JP | 4-4862 | 1/1992 |
| JP | 05-084065 | 4/1993 |
| JP | 05-084066 | 4/1993 |
| JP | 07-236417 | 9/1995 |
| JP | 9-163977 | 6/1997 |
| JP | 2004-215529 | 8/2004 |
| JP | 2004-290012 | 10/2004 |
| JP | 2005-531313 | 10/2005 |
| JP | 2005-333898 | 12/2005 |
| JP | 2007-037503 | 2/2007 |
| JP | 2007-104977 | 4/2007 |
| JP | 2007-195414 | 8/2007 |
| JP | 2007-195415 | 8/2007 |
| WO | WO 03/033681 A2 | 4/2003 |
| WO | WO 03/033681 A3 | 4/2003 |
| WO | WO 2006/093267 A1 | 9/2006 |
| WO | WO 2008/146676 A1 | 12/2008 |

OTHER PUBLICATIONS

JP-03-236741—1991—Official Translation.*
JP-09-188627—1997—English Abstract. pp. 5-6.*
JP-2001-252012—Machine Translation.*
International Search Report (in English), dated Aug. 19, 2008, issued in PCT/JP2008/059039.
Notification of Transmittal of the International Search Report and the Written Opinion of the International Searching Authority, or the Declaration (PCT/ISA/220) with the International Search Report (PCT/ISA/210) and Written Opinion of the International Searching Authority (PCT/ISA/237) (in Japanese), dated Aug. 19, 2008, issued in PCT/JP2008/059039.
First Office Action issued in Chinese Patent Application No. 200880017630.2, date of mailing: Mar. 30, 2011.
English Translation of International Search Report dated Jul. 22, 2008 issued in PCT/JP2008/059340.
Kaneko, S., et al., "Nyusankin o Riyo shita Hakko Tofu no Kaihatsu ni Kansuru Kenkyu (1st report)," *Research report of Food Technology Research Institute of Nagano Prefecture*, 24: 63-66 (Oct. 1996).
Matsuoka, H., "Manufacturing and Ripening of Soybean Cheese," *Journal of the Japanese Society for Food Science and Technology*, 42(11): 945-951 (Nov. 1995).
Notification of Transmittal of the International Search Report and the Written Opinion of the International Searching Authority, or the Declaration (PCT/ISA/220) with the International Search Report (PCT/ISA/210) and Written Opinion of the International Searching Authority (PCT/ISA/237) (in Japanese), dated Jul. 22, 2008, issued in PCT/JP2008/059340.
Angeles, A.G., et al., "Growth and Activity of Lactic-Acid Bacteria in Soymilk. I. Growth and Acid Production," *J. Milk Food Technol.*, 34(1):30-36 (1971).
Supplementary European Search Report dated May 7, 2010, issued in EP 08 76 4463.
Supplemental European Search Report for EP Application No. 08 76 4318, 4 pages, dated Sep. 26, 2011.
Office Aciton U.S. Appl. No. 12/451,676, Date of mailing: Mar. 28, 2012.

* cited by examiner

*Primary Examiner* — D. Lawrence Tarazano
*Assistant Examiner* — Hamid R Badr
(74) *Attorney, Agent, or Firm* — Hamilton, Brook, Smith & Reynolds, P.C.

(57) ABSTRACT

The present invention relates to a method for producing a fermented food or drink product, including: adding a strain of lactic acid bacteria which belongs to *Lactobacillus brevis* to a medium containing 50% or more by mass of a vegetative raw material, and either 0.2 to 2.0% by mass of malic acid or 2.0 to 20.0% by mass of fructose, the medium having a pH of 5.0 to 7.0, and the content of the vegetative raw material being expressed by a content thereof in its natural state; and performing fermentation at least until the termination of a logarithmic growth phase of the strain of lactic acid bacteria, wherein an acid or a strain of lactic acid-producing bacteria is additionally added to the medium at any point in time from the initiation of the fermentation until the termination of the logarithmic growth phase, so as to perform the fermentation with a rate of pH reduction of the medium being 0.01 to 0.3 (1/hour) during a time from the initiation of the fermentation until the termination of the logarithmic growth phase, and with a pH of the medium being 3.3 to 4.6 at the time the fermentation is completed.

13 Claims, 3 Drawing Sheets

FIG. 1A
COLONIES
FIG. 1B
STAINED IMAGE
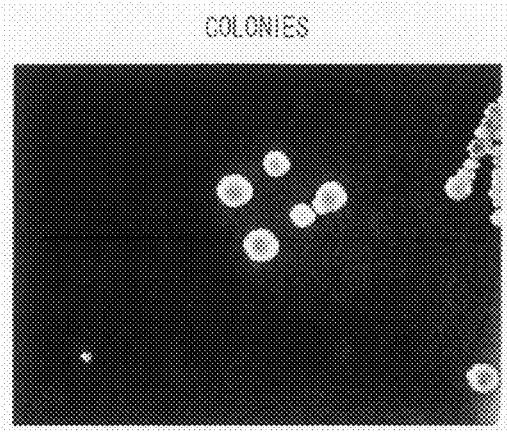
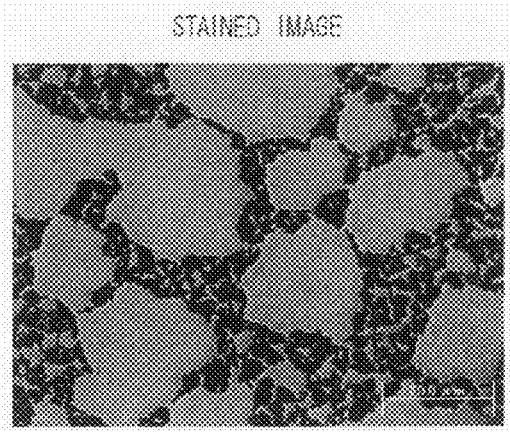
FIG. 2
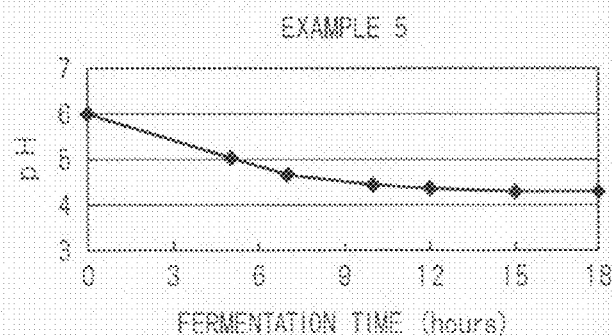
FIG. 3
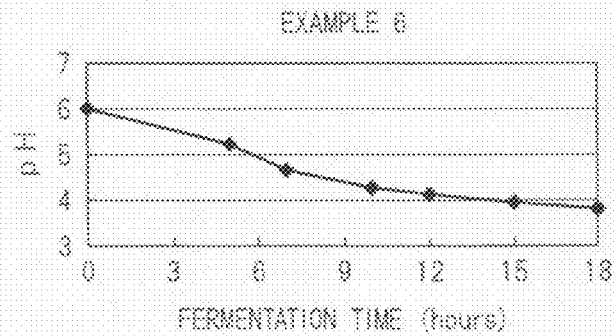

SEQUENCE LISTING

```
<160> NUMBER OF SEQ ID NOS: 1

<210> SEQ ID NO 1
<211> LENGTH: 495
<212> TYPE: DNA
<213> ORGANISM: Lactobacillus pentosus FERM BP-10958
<220> FEATURE:
<221> NAME/KEY: unsure
<222> LOCATION: 22-22
<223> OTHER INFORMATION: n stands for any base

<400> SEQUENCE: 1
cgtggctttc tggttaaata cngtcaatac ctgaacagtt actctcagat atgttcttct      60
ttaacaacag agttttacga gccgaaaccc ttcttcactc acgcggcgtt gctccatcag     120
actttcgtcc attgtggaag attccctact gctgcctccc gtaggagttt gggccgtgtc     180
tcagtcccaa tgtggccgat taccctctca ggtcggctac gtatcattgc catggtgagc     240
cgttacccca ccatctagct aatacgccgc gggaccatcc aaaagtgata gccgaagcca     300
tctttcaaac tcggaccatg cggtccaagt tgttatgcgg tattagcatc tgtttccagg     360
tgttatcccc cgcttctggg caggtttccc acgtgttact caccagttcg ccactcactc     420
aaatgtaaat catgatgcaa gcaccaatca ataccagagt tcgttcgact tgcatgtatt     480
aggcacgccg ccagc                                                      495
```

FERMENTED FOOD OR DRINK PRODUCT, AND METHOD FOR PRODUCING THE SAME

RELATED APPLICATIONS

This application is the U.S. National Stage of International Application No. PCT/JP2008/059039, filed May 16, 2008, which designates the United States, published in Japanese, and claims priority under 35 U.S.C. §§119 or 365(c) to Japanese Application No. 2007-145677, filed May 31, 2007. The entire teachings of the above applications are incorporated herein by reference.

BACKGROUND OF THE INVENTION

1. Field of the Invention

The present invention relates to a fermented food or drink product, prepared by fermenting a vegetative raw material used as a main raw material, and a method for producing the same.

2. Description of the Related Art

Lactic acid bacteria have been used for producing various fermented food or drink products, and some of the bacteria per se have excellent physiological activities, such as intestinal regulatory activity and inhibitory activity against pathogenic bacteria. Such useful lactic acid bacteria is utilized for the production of the food or drink'product, and furthermore excellent fermented food or drink products designed to be food for a person's health can be produced by maintaining living lactic acid bacteria in the fermented food or drink products.

On the other hand, it is known that strains of lactic acid bacteria that belong to *Lactobacillus brevis* (hereinafter sometimes abbreviated as *Lactobacillus brevis*) are especially strongly stress tolerant and have excellent physiological activities over an extremely wide range, among lactic acid bacteria. Reports have been made so far on their use in, for example, antiallergic agents, interferon production enhancers, antigastritis agents and antiulcer agents, hepatitis therapeutic/preventive agents, tumor growth inhibitors, antitumor activators, and γ-aminobutyric acid production.

In this way, since *Lactobacillus brevis* is a very useful lactic acid bacteria which can readily reach the intestine and survive for a long time if taken in a living state, fermented food or drink products which include *Lactobacillus brevis* in a living state are desired to be developed as food or drink products designed for health. Various methods for producing such fermented food or drink products have been proposed. For example, there are disclosed a method for producing fermented food or drink products by utilizing a fermentation medium prepared using milk as a sole raw material, the fermentation medium being generally used to ferment lactic acid, and a method for producing food or drink products in which glutamic acid or a glutamic acid-containing material is added to vegetative raw materials, such as fruits, vegetables, fruit juices or vegetable juices, soybean milk, or wort, to ferment thereof (see Patent Document 1).

Patent Document 1: Japanese Laid-Open Patent Application No. 2004-215529

SUMMARY OF THE INVENTION

However, if a fermentation medium prepared using milk as a sole raw material is used, there are problems in that the multiplication of *Lactobacillus brevis* is only about five times after 48 hours causing insufficient fermentation, and a fermented food or drink product of good quality cannot be obtained.

Moreover, even if fermented food or drink products are prepared by sufficient fermentation using a fermentation medium prepared from raw materials other than milk alone, there are problems in that fermentation of the food or drink products continues to proceed during refrigeration storage time since viable *Lactobacillus brevis* in the food or drink products are strongly stress tolerant, and this causes changes in the taste and flavor of the products and deterioration in quality.

Furthermore, the purpose of the method described in Patent Document 1 is to produce γ-aminobutyric acid having various useful physiological activities by fermentation and obtain a fermented food or drink product containing the amino acid, and there are problems in that an unfavorable product in terms of sensuality such as taste, flavor, and the like is produced due to the effects of glutamic acid remaining in the fermentation medium or γ-aminobutyric acid contained in the obtained food or drink product.

The present invention has been achieved in consideration of the above situation, and has for its object the provision of a fermented food or drink product having a favorable taste, flavor, and being excellent in preservability after production, the fermented food or drink product being obtained by fermenting a medium including a vegetative raw material as a main raw material with use of viable *Lactobacillus brevis*, the fermented food or drink product containing *Lactobacillus brevis* in a living state, and methods for producing the same.

A first aspect of the present invention is a method for producing a fermented food or drink product, including: adding a strain of lactic acid bacteria which belongs to *Lactobacillus brevis* to a medium containing 50% by mass or more of a vegetative raw material and either 0.2 to 2.0% by mass of malic acid or 2.0 to 20.0% by mass of fructose, the medium having a pH of 5.0 to 7.0, and the content of the vegetative raw material being expressed by the content thereof in a natural state; and performing fermentation at least until the termination of a logarithmic growth phase of the strain of lactic acid bacteria, wherein an acid or a strain of lactic acid-producing bacteria is additionally added to the medium at any point in time from the initiation of the fermentation until the termination of the logarithmic growth phase, so as to perform the fermentation with a rate of pH reduction of the medium being 0.01 to 0.3 (1/hour) during a time from the initiation of the fermentation until the termination of the logarithmic growth phase, and with a pH of the medium being 3.3 to 4.6 at a time when the fermentation is completed.

Preferably, the strain of lactic acid bacteria which belongs to *Lactobacillus brevis* is *Lactobacillus brevis* strain FERM BP-4693.

Preferably, the strain of lactic acid-producing bacteria is *Lactobacillus pentosus* strain FERM BP-10958.

Preferably, in the method for producing a fermented food or drink product, the temperature of the fermented product is lowered after the completion of the fermentation.

Preferably, the medium contains 0.1 to 20% by mass, as a non-fat milk solid content, of milk.

Preferably, the medium contains 0.2 to 0.45% by mass of malic acid.

A second aspect of the present invention is a fermented food or drink product obtained by the above production method.

The fermented food or drink product can be a feed for animals.

According to the production method of the present invention, a fermented food or drink product having excellent refrigeration preservability, taste, and flavor, which contains *Lactobacillus brevis* in a living state, can be provided.

BRIEF DESCRIPTION OF THE DRAWINGS

FIG. 1 shows captured images of *Lactobacillus pentosus* BP-10958, wherein FIG. 1A shows an image of colonies, and FIG. 1B shows a stained image thereof.

FIG. 2 is a graph showing the rate of pH reduction of a medium in Example 5.

FIG. 3 is a graph showing the rate of pH reduction of a medium in Example 6.

DETAILED DESCRIPTION OF THE INVENTION

Figure 4:
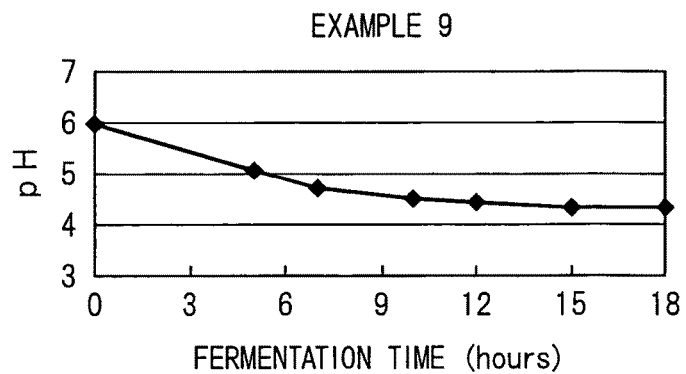
FIG. 4 is a graph showing the rate of pH reduction of a medium in Example 9.

Hereinafter, the present invention will be explained in more detail.

Specific examples of the vegetative raw materials available in the present invention include vegetables, fruits, grains, and beans.

Examples of the vegetables include tomatoes, red bell peppers, carrots, cabbage, Chinese cabbage, lettuce, white radishes, spinach, kale, onions, egg plant, PETIT VERT (trademark, a cross-breed of kale and Brussels sprouts), shiitake mushrooms, and shimeji mushrooms.

Examples of the fruits include grapefruits, oranges, apples, grapes, strawberries, pineapples, kiwi fruits, guava, mangos, acerola, blueberries, pomegranates, peaches, pears, papayas, melons, watermelons, bananas, and figs.

Examples of the grains include wheat (malt) and rice, and examples of the beans include soybeans, and peas.

In the present invention, these vegetative raw materials may be used singularly or in combination of two or more. The optimum combination may be suitably selected depending on the product to be prepared.

In the present invention, the above-mentioned vegetative raw materials may be used in the form of non-concentrated material (non-concentrated juice) such as squeezed liquid, a ground or pulverized material, or a processed material thereof, such as a concentrated material (concentrated juice), diluted material (diluted juice), or dried material. For example, soybeans may be used in the form of soybean milk or suspension of fines thereof.

Among them, it is preferable that the vegetative raw materials be used in the form of transparent juice free from tarnish (hereinafter abbreviated to "clarified juice"), since such a form allows various materials to be mixed for the production of a fermented food or drink product, which increases the general versatility. The clarified juice may be obtained by, for example, filtering juice (such as vegetative juice, fruit juice, soybean milk, or the like) using an ultrafiltration (UF) membrane.

In the present invention, for example, when malic acid is contained in the fermentation medium, it is preferable that at least one selected from the group consisting of carrot and PETIT VERT (trademark) be used as the vegetative raw material in view of the pH and the malic acid content. These vegetables contain a suitable amount of malic acid, and the pH of processed products thereof is close to the pH required to be of the fermentation medium to be used for fermentation. Accordingly, the pH and the malic acid content of the fermentation medium can be readily adjusted by using the vegetables.

Moreover, it is preferable that clarified juice made of at least one selected from the group consisting of carrots and PETIT VERT (trademark) be used in view of the fermentability and the general versatility of the fermented liquid.

For example, when fructose is contained in the fermentation medium, it is preferable that at least one selected from the group consisting of tomatoes, red bell peppers, PETIT VERT (Trademark), and watermelons be used as the vegetative raw material, in view of the pH and the fructose content. These vegetables contain a suitable amount of fructose, and the pH of processed products thereof is close to the pH required to be of the fermentation medium to be used for fermentation. Accordingly, the pH and the fructose content of the fermentation medium can be readily adjusted by using the vegetables.

Moreover, by taking into account the fermentability and the general versatility of the fermented liquid, it is preferable to use clarified juice made of at least one type selected from the group consisting of tomatoes, red bell peppers, PETIT VERT (Trademark), and watermelons.

In the present invention, the fermentation medium contains 50% or more by mass, preferably 75% or more by mass, of the above-mentioned vegetative raw material. The content of the vegetative raw material is expressed by the content thereof in its natural state. Here, the phrase "the content of the vegetative raw material is expressed by the content thereof in its natural state" means that the content of the vegetative raw material is expressed in terms of the percentage thereof in the fermentation medium when the vegetative raw material would be formulated as a naturally-obtained vegetative raw material without being subjected to any process involving changes in the concentration, such as a concentration process or dilution process. Accordingly, if a concentrated product of a vegetative raw material is used, 100% or more by mass of the vegetative raw material can be contained in the fermentation medium, when expressed by the content thereof in its natural state, and the content of the vegetative raw material in the fermentation medium may be suitably adjusted in accordance with the intended purpose.

Although the upper limit of the content of the vegetative raw material in its natural state is not specifically limited, the upper limit thereof in the fermentation medium is preferably 300% by mass, in terms of the fermentation time.

In the present invention, when malic acid is contained in the fermentation medium, the content thereof is 0.2 to 2.0% by mass, and preferably 0.2 to 0.45% by mass. Although carbonic acid produced by fermentation is contained in the fermented product depending on the malic acid content in the fermentation medium, the amount of carbonic acid gas in the fermented product can be reduced by setting the malic acid content to 0.2 to 0.45% by mass, and the obtained fermented food or drink product has less feeling of stimulation and becomes more favorable in terms of sensuality. Moreover, it is preferable to adjust the malic acid content within the above-mentioned range utilizing the malic acid contained in the vegetative raw material by, for example, suitably processing the vegetative raw material and then diluting it with distilled water, or the like. If it is difficult to adjust the malic acid content by utilizing the vegetative raw material alone, malic acid may be separately added for the adjustment unless the effects of the present invention are impaired. When malic acid is separately added, it is preferable to use an aqueous solution of the malic acid.

Since *Lactobacillus brevis* has assimilability of malic acid, the fermentation can be satisfactorily carried out by formulating a suitable amount of malic acid in the medium as mentioned above.

Moreover, in the present invention, when fructose is contained in the fermentation medium, the content thereof is 2.0 to 20.0% by mass, and it is preferable the content be adjusted within the above-mentioned range utilizing the fructose contained in the vegetative raw material by, for example, suitably processing the vegetative raw material and then diluting it with distilled water, or the like. If it is difficult to adjust the fructose content utilizing the vegetative raw material alone, fructose may be separately added for the adjustment unless the effects of the present invention are impaired. When fructose is separately added, it is preferable to use an aqueous solution of the fructose.

Since *Lactobacillus brevis* also has assimilability of fructose, the fermentation can be satisfactorily carried out by formulating a suitable amount of fructose in the medium as mentioned above.

In the present invention, the fermentation may also be carried out by adding milk to the above-mentioned fermentation medium in the amount of 0.1 to 20% by mass, as a non-fat milk solid content. By adding milk in such a manner, the fermentation with *Lactobacillus brevis* can be more satisfactorily carried out and the viable bacterial count in the fermented products can be increased. Examples of milk to be used in such a case include milk of animals, skim milk, fermented milk, and enzyme-treated products thereof. Among these, skim milk is preferably used.

If the amount of milk to be added is less than 0.1% by mass as a non-fat milk solid content, the effect of the addition may not be observed. If the amount of milk to be added is greater than 20% by mass, the fermentation may not favorably proceed due to the stress applied to *Lactobacillus brevis*, the taste and flavor of the obtained fermented food or drink products tend to be deteriorated, and, in some cases, the preparation of the fermentation medium itself may become difficult.

In the present invention, the pH of the fermentation medium is adjusted within the range of 5.0 to 7.0 prior to the fermentation. It is preferable to adjust within the above-mentioned range without using a pH adjustor, for example, by suitably processing the vegetative raw material and then diluting it with distilled water, or the like, or by suitably adjusting the type or the amount of the vegetative raw material. If a pH adjustor is used, one which is generally used for foods may be added for the adjustment to an extent where the effect of the present invention is not impaired, and the type thereof is not specifically limited. Examples of a preferable acid include citric acid, and examples of a preferable base include potassium carbonate. If the pH adjustor to be used is in the form of crystals, it is preferably added as an aqueous solution thereof.

Although the sugar content (hereinafter sometimes abbreviated as Brix) of the fermentation medium is not specifically limited, it is preferably within the range of 6 to 24%.

The medium to be used for the fermentation may be diluted with distilled water or the like after suitably processing the vegetative raw material to adjust either the malic acid content or the fructose content, and the pH within the above-mentioned range. However, the method is not specifically limited thereto. At this time, if necessary, malic acid or fructose, or a pH adjustor may be separately added thereto. The fermentation medium prepared in such a manner is preferably sterilized by heating under predetermined conditions prior to inoculation with *Lactobacillus brevis*.

The water used in the present invention is not specifically limited, and may be one usually used for the production of food or drink products, such as, for example, distilled water, ion-exchanged water, or the like.

In the present invention, the fermentation is carried out by adding *Lactobacillus brevis* to the above-mentioned fermentation medium.

Examples of *Lactobacillus brevis* include *Lactobacillus brevis* strain FERM BP-4693 (hereinafter sometimes abbreviated as *Lactobacillus brevis* strain BP-4693) and *Lactobacillus brevis* strain JCM1059. Among these, *Lactobacillus brevis* strain BP-4693 is preferable, for example, in that the fermentation can more favorably proceed to readily obtain a sufficient viable bacterial count in the fermented product. Moreover, these *Lactobacillus brevis* may be used singularly or in a mixture of two or more types thereof.

*Lactobacillus brevis* strain BP-4693 is available from the International Patent Organism Depository, National Institute of Advanced Industrial Science and Technology (Tsukuba Central 6, 1-1-1 Higashi, Tsukuba-shi, Ibaraki-ken, Japan (postal code 305-8566)), and *Lactobacillus brevis* strain JCM1059 is available from RIKEN BioResource Center.

The *Lactobacillus brevis* is preferably precultured before being used for the fermentation of the medium. The preculture may be carried out by commonly known methods. Examples thereof include a method in which a commercially available medium for lactic acid bacteria is dissolved in distilled water at a predetermined concentration, followed by sterilization in an autoclave, and then *Lactobacillus brevis* is inoculated therein and subjected to preculture for a predetermined time.

The fermentation of the medium using *Lactobacillus brevis* is performed at least until the termination of the logarithmic growth phase of *Lactobacillus brevis*. In other words, the fermentation may be stopped immediately after the termination of the logarithmic growth phase, or alternatively the fermentation may be continuously carried out for a certain period of time after the termination of the logarithmic growth phase before being stopped. Note that the pH of the medium is within the range of 3.3 to 4.6 at the time when the fermentation is completed.

In this case, it is preferable to previously know the time required from the initiation of the fermentation until the termination of the logarithmic growth phase. For this purpose, for example, the required time may be measured by previously performing fermentation under the same conditions. If an acid is added instead of the strain of lactic acid-producing bacteria at any point in time from the initiation of the fermentation until the termination of the logarithmic growth phase, the time required from the initiation of the fermentation until the termination of the logarithmic growth phase becomes approximately constant regardless of the presence/absence of the added acid, and therefore it is not always necessary to add the acid to measure the required time in advance.

In the present invention, an acid or a strain of lactic acid-producing bacteria is additionally added to the medium at any point in time from the initiation of the fermentation until the termination of the logarithmic growth phase. Here, the term "strain of lactic acid-producing bacteria" refers to a strain of lactic acid-producing bacteria other than *Lactobacillus brevis*. The acid or the strain of lactic acid-producing bacteria may be added either once or a plurality of times. When the acid or the strain of lactic acid-producing bacteria is added a plurality of times, the number of times is not specifically limited. Moreover, the addition may be performed at any time if it is within the above-mentioned range. If the strain of lactic acid-producing bacteria is added, the addition is preferably performed at the initiation time of the fermentation since the rate of pH reduction of the medium can be readily controlled and the quality of the obtained fermented food or drink product is excellent. The acid and the strain of lactic acid-producing bacteria may also be used together.

The fermentation is performed so that the rate of pH reduction of the medium is within the range of 0.01 to 0.3 (1/hour) during the time from the initiation of the fermentation until the termination of the logarithmic growth phase, and the pH of the medium is within the range of 3.3 to 4.6 at the time when the fermentation is completed. Here, the term "rate of pH reduction (1/hour)" refers to a pH level reduced per hour.

If the acid or the strain of lactic acid-producing bacteria is not additionally added, the pH at the termination time of the logarithmic growth phase is generally high (approximately 4.8 to 5.8), the fermentation with *Lactobacillus brevis* is left in a relatively active state, and the fermentation further continues to proceed. Therefore, the obtained fermented food or drink products do not have satisfactory quality in terms of taste, flavor, and preservability.

On the other hand, as in the present invention, if the acid or the strain of lactic acid-producing bacteria is added, the pH at the termination time of the logarithmic growth phase of *Lactobacillus brevis* can be set within the pH range required at the time when the fermentation is completed (3.3 to 4.6), and excessive fermentation can be suppressed after the logarithmic growth phase. Therefore, the degree of fermentation becomes a suitable state for obtaining fermented food or drink products having excellent taste, flavor, and preservability.

Moreover, when the rate of pH reduction is within the above-mentioned range, the pH of the medium is gradually reduced in accordance with the logarithmic growth of *Lactobacillus brevis* until the termination thereof. The fermentation activity of *Lactobacillus brevis* is gradually weakened and suitably suppressed accompanying the pH reduction, and therefore the preservability of the obtained fermented food or drink product is enhanced. The rate of pH reduction of the medium may be either set constant or changed during the time from the initiation of the fermentation until the termination of the logarithmic growth phase.

If the strain of lactic acid-producing bacteria is formulated, it is not always necessary to terminate the logarithmic growth phase of the strain of lactic acid-producing bacteria until the termination of the logarithmic growth phase of *Lactobacillus brevis*.

The fermentation of the medium may be performed according to a well known method. For example, the above-mentioned precultured material may be inoculated in the medium to culture *Lactobacillus brevis*. Preferably, the amount of the inoculation at this time is 0.1 to 10% by volume, the temperature during the culture is 20 to 40° C., and the duration is 12 to 72 hours. In the present invention, it is important to control the degree of fermentation to obtain fermented food or drink products having excellent taste, flavor, and preservability. By setting within the above range, fermented food or drink products having more excellent quality can be obtained.

Moreover, if the strain of lactic acid-producing bacteria is added, the method of addition thereof is not specifically limited, although the strain of lactic acid-producing bacteria is preferably precultured before being added. At this time, the preculture of the strain of lactic acid-producing bacteria may be carried out in a similar manner to the case of *Lactobacillus brevis*. For example, the above-mentioned strain of lactic acid-producing bacteria may be added to the fermentation medium preferably at an inoculation amount of 0.1 to 10% by volume.

The acid to be added is not specifically limited, provided that the acid is generally used for food. Examples thereof include acidic organic compounds, such as lactic acid, citric acid, acetic acid, and malic acid, and acidic inorganic compounds, such as phosphoric acid. At least one selected therefrom may be used. Note that, however, as explained above, it is preferable that lactic acid be used if milk is formulated in the fermentation medium in the amount of 0.1 to 20% by mass as a non-fat solid component. Moreover, if the acid to be used is in the form of crystals, it is preferably added as an aqueous solution thereof.

The strain of lactic acid-producing bacteria to be added is not specifically limited, provided that the strain is a strain of lactic acid-producing bacteria other than *Lactobacillus brevis*, and it may be suitably selected depending on the type of the fermented food or drink product to be prepared. Examples thereof include strains of lactic acid bacteria that belong to *Lactobacillus pentosus*, and specifically preferably *Lactobacillus pentosus* strain FERM BP-10958 (hereinafter sometimes abbreviated as *Lactobacillus pentosus* strain BP-10958).

The *Lactobacillus pentosus* strain BP-10958 is a novel strain of lactic acid bacteria selected from bacterial strains derived from shibazuke (obtained by salting and lactic acid fermentation of minced eggplant and red shiso) by screening, and will be explained in more detail later.

In the present invention, with the purpose of improving the taste, flavor, and preservation stability of the fermented food or drink product, a subsidiary material may be added to the fermented product after the fermentation, to an extent where the effect of the present invention is not impaired. The subsidiary material to be used is not specifically limited, provided that it is generally used for food, and examples thereof include spices and sugar solutions. Moreover, one or more types of the subsidiary materials may be used.

In the present invention, it is preferable that the temperature of the fermented product be lowered after completion of the fermentation. By lowering the temperature of the fermented product, progress of the fermentation of the medium can be suppressed, and deterioration in the taste and flavor of the fermented food or drink products can be more effectively suppressed during the preservation. The temperature at this time is preferably 0 to 15° C. Specifically, for example, if the fermentation is carried out at about 30° C., the fermented product may be cooled down to about 10° C. Moreover, it is preferable that the cooling process be carried out immediately after completion of the fermentation.

Furthermore, if the fermented product is cooled down, the above-mentioned subsidiary material may be added either before or after the cooling process.

Almost no increase in the viable bacterial count of *Lactobacillus brevis* in the obtained fermented product is recognized during the cooling preservation, and the favorable taste and flavor immediately after the fermentation can be maintained as it is.

The obtained fermented product may be directly used as a fermented food or drink product, or may be added with suitable additives or processed as required, to be used as a fermented food or drink product.

The fermented food or drink product of the present invention is obtained by the production method described above. Moreover, the fermented food or drink product is also suitable as a feed for animals.

*Lactobacillus pentosus* strain BP-10958 to be used in the present invention will be explained in the following.

<Acquisition of *Lactobacillus pentosus* Strain BP-10958>

Shibazuke collected in the Ohara area of Sakyo-ku, Kyoto, was finely diced into 5 mm cubes or smaller using a sterilized scalpel, and was aseptically diluted with saline progressively through a 10-fold dilution series in eight steps to obtain a series of eight dilution samples.

1 mL of each dilution sample was added dropwise to a petri dish, and an MRS agar medium containing 0.5% (w/v) precipitated calcium carbonate was used to produce an agar plate aseptically by a pour plate method, followed by anaerobic culturing at 30° C. for 48 hours.

After the culturing, the stereoscopic morphology of colonies formed on the center of the agar was observed, and a while lentoid colony having a diameter of about 1 mm was picked up, aseptically stabbed into a stab medium for storage (the MRS agar medium containing 0.5% (w/v) of precipitated calcium carbonate) for inoculation, and then anaerobically cultured at 30° C. for 24 hours.

The bacterial body grown on the stab medium for storage was picked up with a platinum needle and was suspended in 1 mL of a physiological salt solution.

The suspended physiological salt solution and an MRS agar medium containing 0.5% (w/v) of precipitated calcium carbonate were used to produce an agar flat plate aseptically in accordance with a pour plate method, and then anaerobic culturing was performed at 30° C. for 48 hours.

After the culturing, the stereoscopic morphology of colonies formed on the center of the agar was observed, and a lentoid colony having a diameter of about 1 mm was taken out, aseptically stabbed into a stab medium for storage (the MRS agar medium containing 0.5% (w/v) of precipitated calcium carbonate) for inoculation, and then anaerobically cultured at 30° C. for 24 hours.

The bacterial body grown on the stab medium for storage was aseptically picked up with a platinum needle, streaked onto a medium for streak culturing (BL agar medium), and then anaerobically cultured at 30° C. for 48 hours.

After the culturing, the surface morphology of colonies was examined, and a rounded and smoothly-rimmed colony rising in a semicircular shape and having a color tone from the center to the rim becoming reddish brown or white was selected to obtain *Lactobacillus pentosus* BP-10958 (hereinafter sometimes further abbreviated as "present strain"). A captured image of the present strain at that time is shown in FIG. 1. The conditions for capturing images are as follows. Colony image: a close-up picture was taken at a distance of 3 cm from the lens, using a digital camera COOLPIX 4500 (manufactured by Nikon Corporation). Stained image: a picture was taken using a digital camera DP70 (manufactured by Olympus Corporation) and a microscope BX51 (manufactured by Olympus Corporation) and a 100× oil immersion object lens.

<Identification of *Lactobacillus pentosus* Strain BP-10958>

(Morphological Property)

The morphological properties of the present strain were checked by microscopic observation of colonies cultured in each media mentioned above. The results reveled that the present strain has a rod-shaped cell morphology, and neither spore nor motility in the same manner as that of *Lactobacillus pentosus* strain JCM1558$^T$ (hereinafter sometimes abbreviated as "type strain")

(Physiological Property)

The physiological properties of the present strain were evaluated by a commonly known method and were compared with those of the type strain. The results are shown in Table 1.

As shown in Table 1, the present strain showed the same physiological properties as those of the type strain.

TABLE 1

|  |  | Type strain | Present strain |
|---|---|---|---|
| Gram stainability |  | + | + |
| Catalase |  | − | − |
| Acid production from glucose |  | + | + |
| Gas production from glucose |  | + | + |
| Growth | 15° C. | + | + |
|  | 45° C. | − | − |

"+" indicates positive and "−" indicates negative (Degradability of Carbohydrates)

The degradabilities of various types of carbohydrates of the present strain were evaluated using the kit for bacteria identification test, Api 50 CH (manufactured by bio Merieux S.A), and were compared with those of the type strain. The results are shown in Table 2 and Table 3.

As is apparent from Tables 2 and 3, differences in the assimilabilities of D-xylose and D-raffinose were observed between the present strain and the type strain (the difference is shown by "*" in the Tables).

TABLE 2

| No. | Substrate | Type strain | Present strain |
|---|---|---|---|
| 0 | Control | − | − |
| 1 | Glycerol | + | + |
| 2 | Erythritol | − | − |
| 3 | D-arabinose | − | − |
| 4 | L-arabinose | + | + |
| 5 | Ribose | + | + |
| 6 | D-xylose* | + | − |
| 7 | L-xylose | − | − |
| 8 | Adonitol | − | − |
| 9 | β-methyl-D-xylose | − | − |
| 10 | Galactose | + | + |
| 11 | D-glucose | + | + |
| 12 | D-fructose | + | + |
| 13 | D-mannose | + | + |
| 14 | L-sorbose | − | − |
| 15 | Rhamnose | − | − |
| 16 | Dulcitol | − | − |
| 17 | Inositol | − | − |
| 18 | Mannitol | + | + |
| 19 | Sorbitol | + | + |
| 20 | α-methyl-D-mannoside | − | − |
| 21 | α-methyl-D-glucoside | − | − |
| 22 | N-acetyl-glucosamine | + | + |
| 23 | Amygdalin | + | + |
| 24 | Arbutin | + | + |

"+" indicates positive and "−" indicates negative

TABLE 3

| No. | Substrate | Type strain | Present strain |
|---|---|---|---|
| 25 | Esculin | + | + |
| 26 | Salicin | + | + |
| 27 | Cellobiose | + | + |
| 28 | Maltose | + | + |
| 29 | Lactose | + | + |
| 30 | Melibiose | + | + |
| 31 | Sucrose | + | + |
| 32 | Trehalose | + | + |
| 33 | Inulin | − | − |

TABLE 3-continued

| No. | Substrate | Type strain | Present strain |
|---|---|---|---|
| 34 | Melezitose | − | − |
| 35 | D-raffinose* | − | + |
| 36 | Starch | − | − |
| 37 | Glycogen | − | − |
| 38 | Xylitol | − | − |
| 39 | Gentiobiose | + | + |
| 40 | D-turanose | − | − |
| 41 | D-lyxose | − | − |
| 42 | D-tagatose | − | − |
| 43 | D-fucose | − | − |
| 44 | L-fucose | − | − |
| 45 | D-arabitol | − | − |
| 46 | L-arabitol | − | − |
| 47 | Gluconic acid | − | − |
| 48 | 2-ketogluconic acid | − | − |
| 49 | 5-ketogluconic acid | − | − |

"+" indicates positive and "−" indicates negative (Nucleotide Sequence)

The nucleotide sequence (partial sequence) of 16S rDNA of the present strain was determined by a commonly known method. Among the determined nucleotide sequences, the nucleotide sequence from the 5' end (position 1) to the position 495 is shown in SEQ ID NO. 1. The determined nucleotide sequence was subjected to a homology search at the DNA Data Bank of Japan (BLAST) administered by the Center for Information Biology and DDBJ, National Institute of Genetics, Research Organization of Information and Systems, Inter-University Research Institute Corporation.

As a result, the nucleotide sequence shown in SEQ ID NO. 1 of the present strain showed 99% or more homology to the type strain, in which one base in the position 22 was unknown while the rest were the same as the type strain.

(Curd Forming Ability)

Concentrated carrot juice with a Brix of 42% was diluted with distilled water so as to adjust its pH to 6.4 and the Brix to 12%. The thus produced carrot medium was inoculated with 1% (v/v) of a cryopreserved bacterial suspension of *Lactobacillus pentosus* strain BP-10958, and was cultured at 30° C. for 18 hours to effect activation. Then, the resultant product was subcultured under the same conditions, and was used as a preculture solution.

Next, 50 mL of a medium containing 25% (w/v) of commercially available soybean powder, 2% (w/v) of glucose, and 4% (w/v) of fructose was inoculated with 1% (v/v) of the above-mentioned preculture solution, and then cultivation was performed at 30° C. for 9 hours.

As a result, when the culture was completed, the formation of curd was confirmed and the curd did not crumble even if the container was inverted for 60 seconds or more.

On the other hand, the type strain was used instead of the present strain and was cultured in the same manner. As a result, when the culture was completed, although the formation of curd was confirmed, the formed curd quickly crumbled in less than 60 seconds after the container was inverted.

That is, the present strain was remarkably superior to the type strain in the curd forming ability.

As shown in the above results, comparing the present strain and the type strain, the nucleotide sequence of 16S rDNA showed 99% or more homology, and the morphological properties and the physiological properties were the same, although the degradabilities of carbohydrates were different. Moreover, the present strain was remarkably superior to the type strain in curd forming ability during the culture. Thus, the present strain is apparently different from conventional strains of lactic acid bacteria that belong to *Lactobacillus pentosus*.

From the above, the present strain is a novel strain of lactic acid bacteria which belongs to *Lactobacillus pentosus*.

*Lactobacillus pentosus* strain BP-10958 was deposited in the International Patent Organism Depositary, National Institute of Advanced Industrial Science and Technology (Central 6, 1-1, Higashi 1-Chome Tsukuba-shi, Ibaraki-ken, JAPAN (postal code number: 305-8566)) as the accession number of FERM BP-10958 (domestic accession number: FERM P-21248) as of Mar. 9, 2007.

EXAMPLES

Hereinafter, the present invention will be explained in more detail with reference to specific examples. However, the present invention is not to be limited to the following examples.

The fermentation medium was fermented under the conditions shown in Tables 4, 5, 7, 9, 10, and 12, to produce fermented food or drink products. The obtained fermented food or drink products were subjected to a sensory evaluation test. The results are shown in Tables 6, 8, 11, and 13. Carrot juice or tomato juice was used as the substrate of the fermentation medium (refer to "Conditions for Fermentation Medium"). The fermentation medium was fermented to prepare a fermented vegetative liquid, which was used as the fermented food or drink product. For the fermentation, a precultured *Lactobacillus brevis* strain BP-4693 or *Lactobacillus brevis* strain JCM1059 was used (refer to "Strain"). During the fermentation, the pH was reduced by adding citric acid or coculturing with *Lactobacillus pentosus* strain BP-10958 (refer to "pH reduction method"). Hereunder is a further detailed explanation.

<Production of Fermented Food or Drink Products>

(1) Preparation of Precultured Material

A commercially available medium for lactic acid bacteria (M.R.S medium, manufactured by OXOID Limited) was dissolved in distilled water at a concentration of 62 g/L, and was sterilized in an autoclave at 121° C. for 15 minutes. Then, the sterilized medium was inoculated with *Lactobacillus brevis* strain BP-4693 or *Lactobacillus brevis* strain JCM 1059, followed by preculturing at 30° C. for 18 hours.

(2) Preparation of Fermentation Medium (A) In Cases where Carrot Juice was Used as a Substrate Concentrated carrot juice with a pH of 5.5 and a Brix of 42% was diluted with distilled water so as to adjust its pH to 5.7, the malic acid content to 0.3% by mass, and the Brix to 12%. In addition, the pH, the malic acid content, and the Brix were appropriately readjusted as shown in Tables 4, 5 and 7 (refer to "Conditions for Fermentation Medium"). At that time, as shown in Tables 4, 5 and 7, skim milk was added as milk in some of the examples, while skim milk and/or glutamic acid was added in some of the Comparative Examples. Then, the mixture was sterilized in an autoclave at 121° C. for 15 minutes to prepare the fermentation medium. In the case where transparent carrot juice was used as the vegetative raw material, the above-mentioned concentrated carrot juice was diluted with distilled water, the resultant was subjected to filtration with a UF membrane in accordance with a well-known method to obtain a clarified juice, and then the pH, malic acid content, and Brix thereof were adjusted.

(B) In Cases where Tomato Juice was Used as a Substrate

Concentrated tomato juice with a pH of 4.3 and a Brix of 20% was diluted with distilled water so as to adjust its pH to 4.4, the fructose content to 2.5% by mass, and the Brix to 12%. Further, the pH, the fructose content, and the Brix were appropriately readjusted as shown in Tables 9, 10 and 12 (refer to "Conditions for Fermentation Medium"). At that time, as shown in Tables 9, 10 and 12, skim milk was added as milk in some of the examples, while skim milk and/or glutamic acid was added in some of the comparative examples. Then, the mixture was sterilized in an autoclave at 121° C. for 15 minutes to prepare the fermentation medium. In the case where transparent tomato juice was used as the vegetative raw material, the above-mentioned concentrated tomato juice was diluted with distilled water, the resultant was subjected to filtration with a UF membrane in accordance with a well-known method to obtain a clarified juice, and then the pH, fructose content, and Brix thereof were adjusted.

(3) Determination of Termination Time of Logarithmic Growth Phase

1% by volume of the above-mentioned precultured material was inoculated in the above-mentioned fermentation medium, and then cultured at 30° C. for 18 hours to effect fermentation.

During the fermentation, the viable bacterial count was taken hourly to check the time required to terminate the logarithmic growth phase was 10 hours in both cases of *Lactobacillus brevis* strain BP-4693 and *Lactobacillus brevis* strain JCM1059.

(4) Preparation of Fermented Vegetative Liquid (a) pH Adjustment by Adding Citric Acid Citric acid serving as a pH adjustor was dissolved in distilled water so that the content thereof was 40% by mass, and then sterilized in an autoclave at 121° C. for 15 minutes to prepare a sterilized citric acid aqueous solution.

Then, 1% by volume of the above-mentioned precultured material was inoculated in the above-mentioned fermentation medium, and then cultured at 30° C. for 18 hours (108 hours in Comparative Example 2 and Comparative Example 2') to effect fermentation.

During the fermentation, the pH was measured hourly, and the pH was reduced using the above-mentioned sterilized citric acid aqueous solution at each rate shown in Tables 4, 5, 7, 9, 10, and 12, until the termination time of the logarithmic growth phase (10 hours after the initiation of the fermentation) (refer to "pH of medium after logarithmic growth phase").

After the fermentation, the obtained fermentation medium was immediately cooled down to 10° C. to obtain the fermented vegetative liquid.

(b) pH Adjustment by Cocultivation

A commercially available medium for lactic acid bacteria (M.R.S medium, manufactured by OXOID Limited) was dissolved in distilled water at a concentration of 62 g/L, and was sterilized in an autoclave at 121° C. for 15 minutes. Then, the sterilized medium was inoculated with *Lactobacillus pentosus* strain BP-10958, followed by preculturing at 30° C. for 18 hours.

Then, 1% by volume of the above-mentioned precultured material and 1% by volume of the above-mentioned precultured material of *Lactobacillus pentosus* strain BP-10958 were inoculated in the above-mentioned fermentation medium, and then cultured at 30° C. for 18 hours to effect fermentation.

During the fermentation, the pH was measured hourly. The pH of *Lactobacillus brevis* strain BP-4693 or *Lactobacillus brevis* strain JCM1059 at the termination time of the logarithmic growth phase (10 hours after the initiation of fermentation) was as shown in Tables 4, 5, 9, and 10 (refer to "pH of medium after logarithmic growth phase").

After the end of the fermentation, the obtained fermentation medium was immediately cooled to 10° C. to obtain the fermented vegetative liquid.

The contents of malic acid, fructose, milk (non-fat milk solid content), and glutamic acid, shown in Tables 4, 5, 7, 9, 10, and 12, are all expressed as % by mass in the medium. Moreover, the mark "x" of milk and glutamic acid means that they were not separately added to the medium.

In some of the comparative examples, the pH was not adjusted during the fermentation, and the medium was preserved by leaving it still at 10° C. for 3 weeks. In this case, the "rate of pH reduction" is indicated by "–" in Tables 7 and 12.

(5) Preservation of Fermented Vegetative Liquid

A container was filled with the pH-adjusted fermented vegetative liquid, sealed, and then preserved at 10° C. for 3 weeks.

Hereinunder, major characteristics of the production method will be extracted and shown by examples and comparative examples.

(A) In Cases where Carrot Juice was Used as a Substrate

Examples 1-1 to 1-13

Carrot juice (Examples 1-1 to 1-6 and 1-10 to 1-13) or transparent carrot juice (Examples 1-7 to 1-9) was used as the vegetative raw material. The pH and the malic acid content thereof were adjusted to those shown in Table 4, and the Brix thereof was adjusted to 12% (Examples 1-1 to 1-12) or 7% (Example 1-13) to prepare the fermentation medium. Then, the fermentation was carried out using *Lactobacillus brevis* strain BP-4693. Moreover, during the fermentation, the pH was reduced by adding citric acid.

In the following examples and comparative examples, characteristics differing from those of Examples 1-1 to 1-13 are described.

Examples 2-1 to 2-4

Milk was added in the amount shown in Table 4, as a non-fat milk solid content, to prepare the fermentation medium.

Examples 3-1 to 3-3

As shown in Table 5, the rate of pH reduction during the fermentation was 0.25 for the first 5 hours and 0.1 for the following 5 hours in Example 3-1, 0.30 for the first 5 hours and 0.1 for the following 5 hours in Example 3-2, and 0.30 for the first 5 hours and 0.2 for the following 5 hours in Example 3-3.

Examples 4-1 to 4-3

Milk was added in the amount of 3% by mass, as a non-fat milk solid content, to prepare the fermentation medium. In addition, as shown in Table 5, the rate of pH reduction during the fermentation was 0.25 for the first 5 hours and 0.1 for the following hours in Example 4-1, 0.30 for the first 5 hours and 0.1 for the following 5 hours in Example 4-2, and 0.30 for the first 5 hours and 0.2 for the following 5 hours in Example 4-3.

Example 5

During the fermentation, the pH was reduced by coculturing with *Lactobacillus pentosus* strain BP-10958. The rate of the pH reduction at that time is shown in FIG. 2.

Example 6

Milk was added in the amount of 3.0% by mass, as a non-fat milk solid content, to prepare the fermentation medium. In addition, during the fermentation, the pH was reduced by coculturing with *Lactobacillus pentosus* strain BP-10958. The rate of the pH reduction at that time is shown in FIG. 3.

Example 7

The fermentation was carried out using *Lactobacillus brevis* strain JCM1059.

Example 8

Milk was added in the amount of 3.0% by mass, as a non-fat milk solid content, to prepare the fermentation medium. Furthermore, the fermentation was carried out using *Lactobacillus brevis* strain JCM1059.

Example 9

*Lactobacillus brevis* strain JCM1059 was used. Furthermore, during the fermentation, the pH was reduced by coculturing with *Lactobacillus pentosus* strain BP-10958. The rate of the pH reduction at that time is shown in FIG. 4.

Example 10

Figure 5:
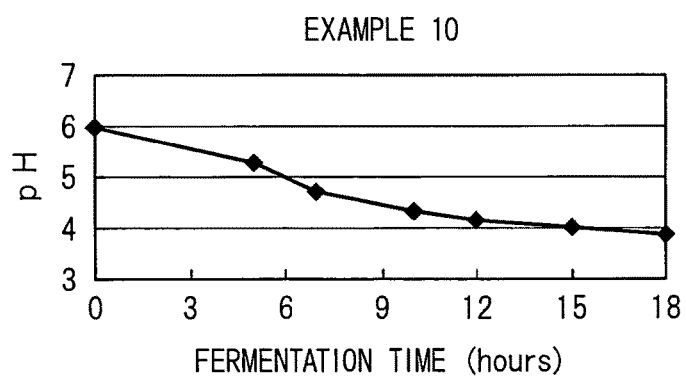
FIG. 5 is a graph showing the rate of pH reduction of a medium in Example 10.

Milk was added in the amount of 3.0% by mass, as a non-fat milk solid content, to prepare the fermentation medium, and *Lactobacillus brevis* strain JCM1059 was used. Furthermore, during the fermentation, the pH was reduced by coculturing with *Lactobacillus pentosus* strain FERM BP-10958. The rate of the pH reduction at that time is shown in FIG. 5.

Comparative Examples 1-1 to 1-3 and Comparative Example 2

During the fermentation, the pH was not reduced by either adding citric acid or coculturing with *Lactobacillus pentosus* strain BP-10958.

Comparative Example 3

Milk was added in the amount of 3.0% by mass, as a non-fat milk solid content, to prepare the fermentation medium. Furthermore, during the fermentation, the pH was not reduced by either adding citric acid or coculturing with *Lactobacillus pentosus* strain BP-10958.

Comparative Examples 4-1 to 4-6

The malic acid content was less than 0.2% by mass (Comparative Example 4-1) or more than 2.0% by mass (Comparative Example 4-2) to prepare the fermentation medium, or alternatively the pH thereof was less than 5.0 (Comparative Examples 4-3 and 4-5) or more than 7.0 or higher (Comparative Examples 4-4 and 4-6) to prepare the fermentation medium, and the fermentation was carried out. Furthermore, in Comparative Example 4-1, the Brix of the fermentation medium was 7%.

Comparative Example 5

The rate of pH reduction during the fermentation was more than 0.3.

Comparative Example 6

Milk was added in the amount of 3.0% by mass, as a non-fat milk solid content, to prepare the fermentation medium. Furthermore, the rate of pH reduction during the fermentation was more than 0.3.

Comparative Example 7

Glutamic acid was added in the amount of 0.3% by mass to prepare the fermentation medium.

Comparative Example 8

Milk was added in the amount of 3.0% by mass, as a non-fat milk solid content, and glutamic acid was added in the amount of 0.3% by mass to prepare the fermentation medium.

Comparative Example 9

The fermentation was carried out using *Lactobacillus brevis* strain JCM1059. Furthermore, during the fermentation, the pH was not reduced by either adding citric acid or coculturing with *Lactobacillus pentosus* strain BP-10958.

Comparative Example 10

Milk was added in the amount of 3.0% by mass, as a non-fat milk solid content, to prepare the fermentation medium, and the fermentation was carried out using *Lactobacillus brevis* strain JCM1059. Furthermore, during the fermentation, the pH was not reduced by either adding citric acid or coculturing with *Lactobacillus pentosus* strain BP-10958.

(B) In Cases where Tomato Juice was Used as a Substrate

Examples 1'-1 to 1'-10

Tomato juice (Examples 1'-1 to 1'-3 and 1'-7 to 1'-10) or transparent tomato juice (Examples 1'-4 to 1'-6) was used as the vegetative raw material. The pH and the fructose content thereof were adjusted to those shown in Table 9, and the Brix thereof was adjusted to 12% (Examples 1'-1 to 1'-9) or 7% (Example 1'-10) to prepare the fermentation medium. Then, the fermentation was carried out using *Lactobacillus brevis* strain BP-4693. Moreover, during the fermentation, the pH was reduced by adding citric acid.

In the following, Examples and Comparative Examples, characteristics differing from those of Examples 1'-1 to 1'-10 are described.

Examples 2'-1 to 2'-4

Milk was added in the amount shown in Table 9, as a non-fat milk solid content, to prepare the fermentation medium.

Examples 3'-1 to 3'-3

As shown in Table 10, the rate of pH reduction during the fermentation was 0.25 for the first 5 hours and 0.1 for the following 5 hours in Example 3'-1, 0.30 for the first 5 hours and 0.1 for the following 5 hours in Example 3'-2, and 0.30 for the first 5 hours and 0.2 for the following 5 hours in Example 3'-3.

Examples 4'-1 to 4'-3

Milk was added in the amount of 3% by mass, as a non-fat milk solid content, to prepare the fermentation medium. Furthermore, as shown in Table 10, the rate of pH reduction during the fermentation was 0.25 for the first 5 hours and 0.1 for the following 5 hours in Example 4'-1, 0.30 for the first 5 hours and 0.1 for the following 5 hours in Example 4'-2, and 0.30 for the first 5 hours and 0.2 for the following 5 hours in Example 4'-3.

Example 5'

Figure 6:
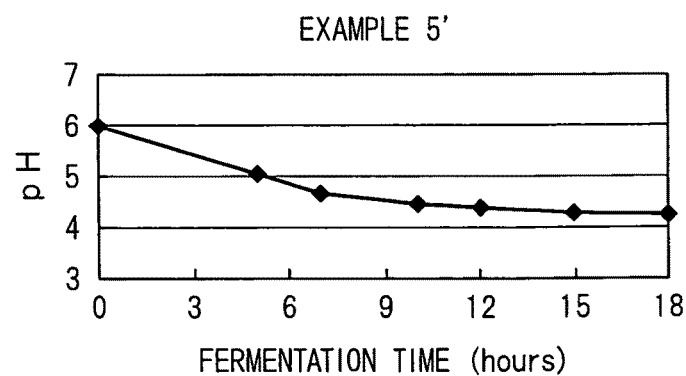
FIG. 6 is a graph showing the rate of pH reduction of a medium in Example 5'.

During the fermentation, the pH was reduced by coculturing with *Lactobacillus pentosus* strain BP-10958. The rate of pH reduction at that time is shown in FIG. 6.

Example 6'

Figure 7:
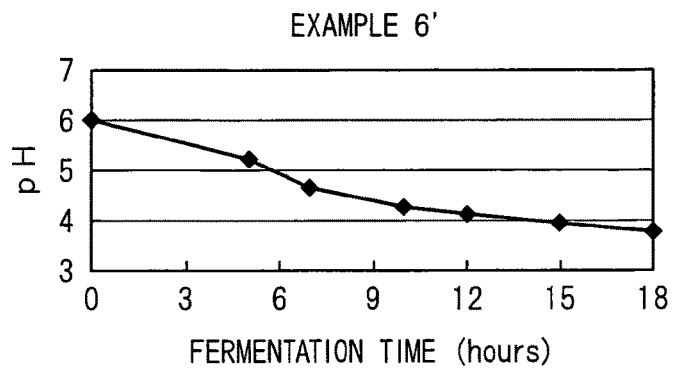
FIG. 7 is a graph showing the rate of pH reduction of a medium in Example 6'.

Milk was added in the amount of 3.0% by mass, as a non-fat milk solid content, to prepare the fermentation medium. Furthermore, during the fermentation, the pH was reduced by coculturing with *Lactobacillus pentosus* strain BP-10958. The rate of the pH reduction at that time is shown in FIG. 7.

Example 7'

The fermentation was carried out using *Lactobacillus brevis* strain JCM1059.

Example 8'

Milk was added in the amount of 3.0% by mass, as a non-fat milk solid content, to prepare the fermentation medium. Furthermore, the fermentation was carried out using *Lactobacillus brevis* strain JCM1059.

Example 9'

Figure 8:
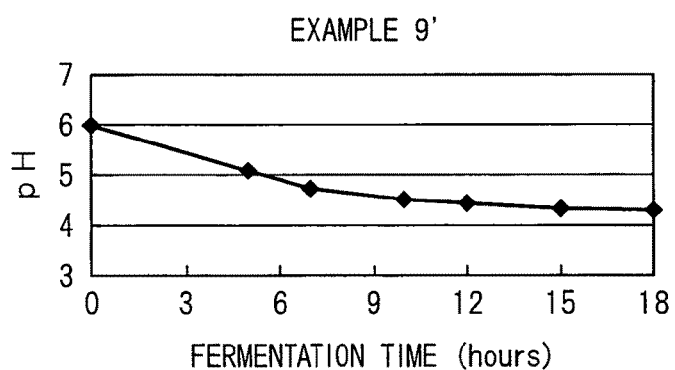
FIG. 8 is a graph showing the rate of pH reduction of a medium in Example 9'.

*Lactobacillus brevis* strain JCM1059 was used. Furthermore, during the fermentation, the pH was reduced by coculturing with *Lactobacillus pentosus* strain BP-10958. The rate of the pH reduction at that time is shown in FIG. 8.

Example 10'

Figure 9:
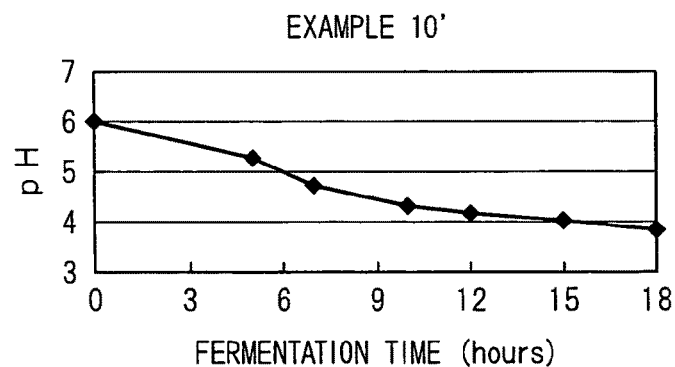
FIG. 9 is a graph showing the rate of pH reduction of a medium in Example 10'.

Milk was added in the amount of 3.0% by mass, as a non-fat milk solid content, to prepare the fermentation medium, and *Lactobacillus brevis* strain JCM1059 was used. Furthermore, during the fermentation, the pH was reduced by coculturing with *Lactobacillus pentosus* strain BP-10958. The rate of the pH reduction at that time is shown in FIG. 9.

Comparative Examples 1'-1 to 1'-3 and Comparative Example 2'

During the fermentation, the pH was not reduced by either adding citric acid or coculturing with *Lactobacillus pentosus* strain BP-10958.

Comparative Example 3'

Milk was added in the amount of 3.0% by mass, as a non-fat milk solid content, to prepare the fermentation medium. Furthermore, during the fermentation, the pH was not reduced by either adding citric acid or coculturing with *Lactobacillus pentosus* strain BP-10958.

Comparative Examples 4'-1 to 4'-6

The fructose content was less than 2.0% by mass (Comparative Example 4'-1) or more than 20.0% by mass (Comparative Example 4'-2) to prepare the fermentation medium, or alternatively the pH thereof was less than 5.0 (Comparative Examples 4'-3 and 4'-5) or more than 7.0 (Comparative Examples 4'-4 and 4'-6) to prepare the fermentation medium, and the fermentation was carried out. Furthermore, in Comparative Example 4'-1, the Brix of the fermentation medium was 7%.

Comparative Example 5'

The rate of the pH reduction during the fermentation was more than 0.3.

Comparative Example 6'

Milk was added in the amount of 3.0% by mass, as a non-fat milk solid content, to prepare the fermentation medium. Furthermore, the rate of the pH reduction during the fermentation was more than 0.3.

Comparative Example 7'

Glutamic acid was added in the amount of 0.3% by mass to prepare the fermentation medium.

Comparative Example 8'

Milk was added in the amount of 3.0% by mass, as a non-fat milk solid content, and glutamic acid was added in the amount of 0.3% by mass to prepare the fermentation medium.

Comparative Example 9'

The fermentation was carried out using *Lactobacillus brevis* strain JCM1059. Furthermore, during the fermentation, the pH was not reduced by either adding citric acid or coculturing with *Lactobacillus pentosus* strain BP-10958.

Comparative Example 10'

Milk was added in the amount of 3.0% by mass, as a non-fat milk solid content, to prepare the fermentation medium, and the fermentation was carried out using *Lactobacillus brevis* strain JCM1059. Furthermore, during the fermentation, the pH was not reduced by either adding citric acid or coculturing with *Lactobacillus pentosus* strain BP-10958.

<Measurement of Viable Bacterial Count in Fermented Food or Drink Product>

The viable bacterial counts of *Lactobacillus brevis* strain BP-4693 or *Lactobacillus brevis* strain JCM1059 were measured immediately after completion of the fermentation of the fermented vegetative liquid and after preservation thereof, by the following method. The measured results are shown in Tables 6, 8, 11, and 13 (refer to "Bacterial count immediately after termination of fermentation" and "Bacterial count after preservation").

(1) Measurement Method in Cases where the Fermentation was Carried Out by Either *Lactobacillus brevis* Strain BP-4693 or *Lactobacillus brevis* Strain JCM1059 Alone A plate count agar medium with bromocresol purple (BCP) (manufactured by Eiken Chemical Co., Ltd.) was dissolved at a predetermined concentration, followed by sterilization at 121° C. for 15 minutes. Then, the obtained fermented liquid was appropriately subjected to stepwise serial dilutions, and the diluted solutions were added to the sterilized medium, followed by culturing at 35° C. for 72 hours to measure the bacterial count.

(2) Measurement Method in Cases where the Cofermentation was Carried Out by Either *Lactobacillus brevis* Strain BP-4693 or *Lactobacillus brevis* Strain JCM1059 Together with *Lactobacillus pentosus* Strain BP-10958

(a) Measurement of Total Bacterial Count

The plate count agar medium with BCP (manufactured by Eiken Chemical Co., Ltd.) was dissolved at a predetermined concentration, followed by sterilization at 121° C. for 15 minutes. Then, the obtained fermented liquid was appropriately subjected to stepwise serial dilutions, and the diluted solutions were added to the sterilized medium, followed by culturing at 35° C. for 72 hours to measure the total bacterial count in the cultured material.

(b) Measurement of Bacterial Count of *Lactobacillus pentosus* Strain BP-10958

Salt was added to the plate count agar medium with BCP at a final concentration of 6.5% by mass to prepare a medium. Then, the obtained fermented liquid was appropriately subjected to stepwise serial dilutions, and the diluted solutions were added to the sterilized medium, followed by culturing at 35° C. for 72 hours to measure the bacterial count of *Lactobacillus pentosus* strain BP-10958 in the cultured material.

(c) Measurement of Bacterial Count of *Lactobacillus brevis* Strain BP-4693 or *Lactobacillus brevis* Strain JCM1059

The above bacterial count of *Lactobacillus pentosus* strain BP-10958 (b) was subtracted from the above total bacterial count (a) to obtain a bacterial count of *Lactobacillus brevis* strain BP-4693 or *Lactobacillus brevis* strain JCM1059.

<Sensory Evaluation of Fermented Food or Drink Products>

(1) Evaluation Method

After the fermentation, the fermented vegetative liquid was separately cryopreserved. The thawed product thereof was compared with the above-mentioned fermented liquid that had been preserved at 10° C., to carry out a sensory evaluation in terms of preference by a total of 50 panelists consisting of 25 men and 25 women (Evaluation 1).

Moreover, the above-mentioned fermented liquid that had been preserved at 10° C. was compared between respective Examples and Comparative Examples, to carry out a sensory evaluation in terms of preference by a total of 50 panelists consisting of 25 men and 25 women (Evaluation 2).

The results are shown in Tables 6, 8, 11, and 13 (refer to "Sensory Evaluation after Preservation").

TABLE 4

| | | Process | | | | | | | |
|---|---|---|---|---|---|---|---|---|---|
| | | Conditions for Fermentation Medium | | | | | | | pH of medium |
| Lot | Substrate | Malic acid (%) | Milk (non-fat milk solid content) (%) | pH | Glu addition | Strain | pH reduction method | Rate of pH reduction (1/hour) | after logarithmic growth phase |
| Example 1 Series | | 0.3 to 1.8 | x | 5.0 to 7.0 | x | BP-4693 | Addition of acid | 0.1 to 0.3 | 4.0 |
| 1-1 | Carrot juice/Brix 12 | 0.3 | x | 5.0 | x | BP-4693 | Addition of acid | 0.1 | 4.0 |
| 1-2 | Carrot juice/Brix 12 | 0.3 | x | 6.0 | x | BP-4693 | Addition of acid | 0.2 | 4.0 |
| 1-3 | Carrot juice/Brix 12 | 0.3 | x | 7.0 | x | BP-4693 | Addition of acid | 0.3 | 4.0 |
| 1-4 | Carrot juice/Brix 12 | 0.5 | x | 5.0 | x | BP-4693 | Addition of acid | 0.1 | 4.0 |
| 1-5 | Carrot juice/Brix 12 | 0.5 | x | 6.0 | x | BP-4693 | Addition of acid | 0.2 | 4.0 |
| 1-6 | Carrot juice/Brix 12 | 0.5 | x | 7.0 | x | BP-4693 | Addition of acid | 0.3 | 4.0 |
| 1-7 | Transparent carrot juice/Brix 12 | 1.0 | x | 5.0 | x | BP-4693 | Addition of acid | 0.1 | 4.0 |
| 1-8 | Transparent carrot juice/Brix 12 | 1.0 | x | 6.0 | x | BP-4693 | Addition of acid | 0.2 | 4.0 |
| 1-9 | Transparent carrot juice/Brix 12 | 1.0 | x | 7.0 | x | BP-4693 | Addition of acid | 0.3 | 4.0 |
| 1-10 | Carrot juice/Brix 12 | 1.8 | x | 5.0 | x | BP-4693 | Addition of acid | 0.1 | 4.0 |
| 1-11 | Carrot juice/Brix 12 | 1.8 | x | 6.0 | x | BP-4693 | Addition of acid | 0.2 | 4.0 |
| 1-12 | Carrot juice/Brix 12 | 1.8 | x | 7.0 | x | BP-4693 | Addition of acid | 0.3 | 4.0 |
| 1-13 | Carrot juice/Brix 7 | 0.3 | x | 6.0 | x | BP-4693 | Addition of acid | 0.2 | 4.0 |
| Example 2 Series | | 0.3 | 0.2 to 20.0 | 6.0 | x | BP-4693 | Addition of acid | 0.2 | 4.0 |
| 2-1 | Carrot juice/Brix 12 | 0.3 | 0.2 | 6.0 | x | BP-4693 | Addition of acid | 0.2 | 4.0 |

TABLE 4-continued

| | | Process | | | | | | | |
|---|---|---|---|---|---|---|---|---|---|
| | | Conditions for Fermentation Medium | | | | | | | pH of medium |
| Lot | Substrate | Malic acid (%) | Milk (non-fat milk solid content) (%) | pH | Glu addition | Strain | pH reduction method | Rate of pH reduction (l/hour) | after logarithmic growth phase |
| 2-2 | Carrot juice/Brix 12 | 0.3 | 3.0 | 6.0 | x | BP-4693 | Addition of acid | 0.2 | 4.0 |
| 2-3 | Carrot juice/Brix 12 | 0.3 | 15.0 | 6.0 | x | BP-4693 | Addition of acid | 0.2 | 4.0 |
| 2-4 | Carrot juice/Brix 12 | 0.3 | 20.0 | 6.0 | x | BP-4693 | Addition of acid | 0.2 | 4.0 |

TABLE 5

| | | Process | | | | | | | |
|---|---|---|---|---|---|---|---|---|---|
| | | Conditions for Fermentation Medium | | | | | | | |
| Lot | Substrate | Malic acid (%) | Milk (non-fat milk solid content) (%) | pH | Glu addition | Strain | pH reduction method | Rate of pH reduction (l/hour) | pH of medium after logarithmic growth phase |
| Example 3 Series | | 0.3 | x | 5.0 to 7.0 | x | BP-4693 | Addition of acid | | 3.3 to 4.5 |
| 3-1 | Carrot juice/Brix 12 | 0.3 | x | 5.0 | x | BP-4693 | Addition of acid | 0.25 (5 hours) → 0.1 (5 hours) | 3.3 |
| 3-2 | Carrot juice/Brix 12 | 0.3 | x | 6.0 | x | BP-4693 | Addition of acid | 0.30 (5 hours) → 0.1 (5 hours) | 4.0 |
| 3-3 | Carrot juice/Brix 12 | 0.3 | x | 7.0 | x | BP-4693 | Addition of acid | 0.30 (5 hours) → 0.2 (5 hours) | 4.5 |
| Example 4 Series | | 0.3 | 3.0 | 5.0 to 7.0 | x | BP-4693 | Addition of acid | | 3.3 to 4.5 |
| 4-1 | Carrot juice/Brix 12 | 0.3 | 3.0 | 5.0 | x | BP-4693 | Addition of acid | 0.25 (5 hours) → 0.1 (5 hours) | 3.3 |
| 4-2 | Carrot juice/Brix 12 | 0.3 | 3.0 | 6.0 | x | BP-4693 | Addition of acid | 0.30 (5 hours) → 0.1 (5 hours) | 4.0 |
| 4-3 | Carrot juice/Brix 12 | 0.3 | 3.0 | 7.0 | x | BP-4693 | Addition of acid | 0.30 (5 hours) → 0.2 (5 hours) | 4.5 |
| Example 5 | Carrot juice/Brix 12 | 0.3 | x | 6.0 | x | BP-4693 | Coculturing | Refer to FIG. 2 | 4.45 |
| Example 6 | Carrot juice/Brix 12 | 0.3 | 3.0 | 6.0 | x | BP-4693 | Coculturing | Refer to FIG. 3 | 4.27 |
| Example 7 | Carrot juice/Brix 12 | 0.3 | x | 6.0 | x | JCM1059 | Addition of acid | 0.2 | 4.0 |
| Example 8 | Carrot juice/Brix 12 | 0.3 | 3.0 | 6.0 | x | JCM1059 | Addition of acid | 0.2 | 4.0 |
| Example 9 | Carrot juice/Brix 12 | 0.3 | x | 6.0 | x | JCM1059 | Coculturing | Refer to FIG. 4 | 4.50 |
| Example 10 | Carrot juice/Brix 12 | 0.3 | 3.0 | 6.0 | x | JCM1059 | Coculturing | Refer to FIG. 5 | 4.32 |

TABLE 6

| | Effects | | | |
|---|---|---|---|---|
| | Bacterial count immediately after termination of fermentation | Bacterial count after preservation | Sensory Evaluation after Preservation | |
| | | | Evaluation 1 | Evaluation 2 |
| Example 1 Series | | | | |
| 1-1 | $5 \times 10^8$ | $5 \times 10^8$ | No significant difference | No significant difference compared to Example 1-2 |
| 1-2 | $5 \times 10^8$ | $5 \times 10^8$ | No significant difference | — |
| 1-3 | $5 \times 10^8$ | $5 \times 10^8$ | No significant difference | No significant difference compared to Example 1-2 |
| 1-4 | $5 \times 10^8$ | $5 \times 10^8$ | No significant difference | No significant difference compared to Example 1-5 |
| 1-5 | $5 \times 10^8$ | $5 \times 10^8$ | No significant difference | — |
| 1-6 | $5 \times 10^8$ | $5 \times 10^8$ | No significant difference | No significant difference compared to Example 1-5 |

TABLE 6-continued

| | Effects | | | |
|---|---|---|---|---|
| | Bacterial count immediately after termination of fermentation | Bacterial count after preservation | Sensory Evaluation after Preservation | |
| | | | Evaluation 1 | Evaluation 2 |
| 1-7 | $5 \times 10^8$ | $5 \times 10^8$ | No significant difference | No significant difference compared to Example 1-8 |
| 1-8 | $5 \times 10^8$ | $5 \times 10^8$ | No significant difference | — |
| 1-9 | $5 \times 10^8$ | $5 \times 10^8$ | No significant difference | No significant difference compared to Example 1-8 |
| 1-10 | $5 \times 10^8$ | $5 \times 10^8$ | No significant difference | No significant difference compared to Example 1-11 |
| 1-11 | $5 \times 10^8$ | $5 \times 10^8$ | No significant difference | — |
| 1-12 | $5 \times 10^8$ | $5 \times 10^8$ | No significant difference | No significant difference compared to Example 1-11 |
| 1-13 | $5 \times 10^8$ | $5 \times 10^8$ | No significant difference | — |
| Example 2 Series | | | | — |
| 2-1 | $1 \times 10^9$ | $1 \times 10^9$ | No significant difference | — |
| 2-2 | $1 \times 10^9$ | $1 \times 10^9$ | No significant difference | — |
| 2-3 | $7 \times 10^8$ | $7 \times 10^8$ | No significant difference | — |
| 2-4 | $7 \times 10^8$ | $7 \times 10^8$ | No significant difference | — |
| Example 3 Series | | | | — |
| 3-1 | $5 \times 10^8$ | $5 \times 10^8$ | No significant difference | — |
| 3-2 | $5 \times 10^8$ | $5 \times 10^8$ | No significant difference | — |
| 3-3 | $5 \times 10^8$ | $5 \times 10^8$ | No significant difference | — |
| Example 4 Series | | | | — |
| 4-1 | $1 \times 10^9$ | $1 \times 10^9$ | No significant difference | — |
| 4-2 | $1 \times 10^9$ | $1 \times 10^9$ | No significant difference | — |
| 4-3 | $1 \times 10^9$ | $1 \times 10^9$ | No significant difference | — |
| Example 5 | $5 \times 10^8$ | $5 \times 10^8$ | No significant difference | Significant difference compared to Example 1-2 |
| Example 6 | $1 \times 10^9$ | $1 \times 10^9$ | No significant difference | Significant difference compared to Example 2-2 |
| Example 7 | $1 \times 10^8$ | $1 \times 10^8$ | No significant difference | — |
| Example 8 | $5 \times 10^8$ | $5 \times 10^8$ | No significant difference | — |
| Example 9 | $1 \times 10^8$ | $1 \times 10^8$ | No significant difference | Significant difference compared to Example 7 |
| Example 10 | $5 \times 10^8$ | $5 \times 10^8$ | No significant difference | Significant difference compared to Example 8 |

TABLE 7

| Lot | Substrate | Malic acid (%) | Milk (non-fat milk solid content) (%) | pH | Glu addition | Strain | pH reduction method | Rate of pH reduction (l/hour) | pH of medium after logarithmic growth phase |
|---|---|---|---|---|---|---|---|---|---|
| Comparative Example 1 Series | | 0.3 | | 5.0 to 7.0 | x | BP-4693 | None | — | 4.8 to 6.8 |
| 1-1 | Carrot juice/Brix 12 | 0.3 | x | 5.0 | x | BP-4693 | None | — | 4.8 |
| 1-2 | Carrot juice/Brix 12 | 0.3 | x | 6.0 | x | BP-4693 | None | — | 5.8 |
| 1-3 | Carrot juice/Brix 12 | 0.3 | x | 7.0 | x | BP-4693 | None | — | 6.8 |
| Comparative Example 2 | Carrot juice/Brix 12 | 0.3 | x | 5.0 | x | BP-4693 | None | — | 4.0 |
| Comparative Example 3 | Carrot juice/Brix 12 | 0.3 | 3.0 | 6.0 | x | BP-4693 | None | — | 5.8 |
| Comparative Example 4 Series | | | x | | x | BP-4693 | Addition of acid | 0.2 | |
| 4-1 | Carrot juice/Brix 7 | 0.18 | x | 6.0 | x | BP-4693 | Addition of acid | 0.2 | 4.0 |
| 4-2 | Carrot juice/Brix 12 | 2.5 | x | 6.0 | x | BP-4693 | Addition of acid | 0.2 | 4.0 |
| 4-3 | Carrot juice/Brix 12 | 0.3 | x | 4.5 | x | BP-4693 | Addition of acid | 0.2 | 2.5 |
| 4-4 | Carrot juice/Brix 12 | 0.3 | x | 7.5 | x | BP-4693 | Addition of acid | 0.2 | 5.5 |
| 4-5 | Carrot juice/Brix 12 | 1.8 | x | 4.5 | x | BP-4693 | Addition of acid | 0.2 | 2.5 |
| 4-6 | Carrot juice/Brix 12 | 1.8 | x | 7.5 | x | BP-4693 | Addition of acid | 0.2 | 5.5 |
| Comparative Example 5 | Carrot juice/Brix 12 | 0.3 | x | 6.0 | x | BP-4693 | Addition of acid | 0.4 | 2.0 |
| Comparative Example 6 | Carrot juice/Brix 12 | 0.3 | 3.0 | 6.0 | x | BP-4693 | Addition of acid | 0.4 | 2.0 |
| Comparative Example 7 | Carrot juice/Brix 12 | 0.3 | x | 6.0 | 0.3 | BP-4693 | Addition of acid | 0.2 | 4.0 |
| Comparative Example 8 | Carrot juice/Brix 12 | 0.3 | 3.0 | 6.0 | 0.3 | BP-4693 | Addition of acid | 0.2 | 4.0 |
| Comparative Example 9 | Carrot juice/Brix 12 | 0.3 | x | 6.0 | x | JCM1059 | None | — | 5.8 |
| Comparative Example 10 | Carrot juice/Brix 12 | 0.3 | 3.0 | 6.0 | x | JCM1059 | None | — | 5.8 |

TABLE 8

| | Bacterial count immediately after termination of fermentation | Bacterial count after preservation | Sensory Evaluation after Preservation | |
|---|---|---|---|---|
| | | | Evaluation 1 | Evaluation 2 |
| Comparative Example 1 Series | | | | |
| 1-1 | $5 \times 10^8$ | $1 \times 10^9$ | Significant difference | Significant difference compared to Example 1-1 |
| 1-2 | $5 \times 10^8$ | $1 \times 10^9$ | Significant difference | Significant difference compared to Example 1-2 |
| 1-3 | $5 \times 10^8$ | $1 \times 10^9$ | Significant difference | Significant difference compared to Example 1-3 |
| Comparative Example 2 | $5 \times 10^8$ | $5 \times 10^8$ | No significant difference | Significant difference compared to Example 1-1 |
| Comparative Example 3 | $1 \times 10^9$ | $1 \times 10^9$ | Significant difference | Significant difference compared to Example 2-2 |
| Comparative Example 4 Series | | | | |
| 4-1 | $1 \times 10^7$ | $1 \times 10^7$ | No significant difference | Significant difference compared to Example 1-13 |
| 4-2 | $5 \times 10^8$ | $5 \times 10^8$ | No significant difference | Significant difference compared to Example 1-2 |

TABLE 8-continued

| | Effects | | | |
|---|---|---|---|---|
| | Bacterial count immediately after termination of fermentation | Bacterial count after preservation | Sensory Evaluation after Preservation | |
| | | | Evaluation 1 | Evaluation 2 |
| 4-3 | $1 \times 10^7$ | $1 \times 10^7$ | No significant difference | Significant difference compared to Example 1-2 |
| 4-4 | $1 \times 10^7$ | $1 \times 10^7$ | No significant difference | Significant difference compared to Example 1-2 |
| 4-5 | $1 \times 10^7$ | $1 \times 10^7$ | No significant difference | Significant difference compared to Example 1-11 |
| 4-6 | $1 \times 10^7$ | $1 \times 10^7$ | No significant difference | Significant difference compared to Example 1-11 |
| Comparative Example 5 | $1 \times 10^7$ | $1 \times 10^7$ | No significant difference | Significant difference compared to Example 1-2 |
| Comparative Example 6 | $1 \times 10^7$ | $1 \times 10^7$ | No significant difference | Significant difference compared to Example 2-2 |
| Comparative Example 7 | $5 \times 10^8$ | $5 \times 10^8$ | No significant difference | Significant difference compared to Example 1-2 |
| Comparative Example 8 | $1 \times 10^9$ | $1 \times 10^9$ | No significant difference | Significant difference compared to Example 2-2 |
| Comparative Example 9 | $1 \times 10^8$ | $5 \times 10^8$ | Significant difference | Significant difference compared to Example 7 |
| Comparative Example 10 | $5 \times 10^8$ | $1 \times 10^9$ | Significant difference | Significant difference compared to Example 8 |

TABLE 9

| | Process | | | | | | | | |
|---|---|---|---|---|---|---|---|---|---|
| | Conditions for Fermentation Medium | | | | | | | | pH of |
| Lot | Substrate | Fructose (%) | Milk (non-fat milk solid content) (%) | pH | Glu addition | Strain | pH reduction method | Rate of pH reduction (l/hour) | medium after logarithmic growth phase |
| Example 1' Series | | 2.5 to 18.0 | x | 5.0 to 7.0 | x | BP-4693 | Addition of acid | 0.1 to 0.3 | 4.0 |
| 1'-1 | Tomato juice/Brix 12 | 2.5 | x | 5.0 | x | BP-4693 | Addition of acid | 0.1 | 4.0 |
| 1'-2 | Tomato juice/Brix 12 | 2.5 | x | 6.0 | x | BP-4693 | Addition of acid | 0.2 | 4.0 |
| 1'-3 | Tomato juice/Brix 12 | 2.5 | x | 7.0 | x | BP-4693 | Addition of acid | 0.3 | 4.0 |
| 1'-4 | Transparent tomato juice/Brix 12 | 10.0 | x | 5.0 | x | BP-4693 | Addition of acid | 0.1 | 4.0 |
| 1'-5 | Transparent tomato juice/Brix 12 | 10.0 | x | 6.0 | x | BP-4693 | Addition of acid | 0.2 | 4.0 |
| 1'-6 | Transparent tomato juice/Brix 12 | 10.0 | x | 7.0 | x | BP-4693 | Addition of acid | 0.3 | 4.0 |
| 1'-7 | Tomato juice/Brix 12 | 18.0 | x | 5.0 | x | BP-4693 | Addition of acid | 0.1 | 4.0 |
| 1'-8 | Tomato juice/Brix 12 | 18.0 | x | 6.0 | x | BP-4693 | Addition of acid | 0.2 | 4.0 |
| 1'-9 | Tomato juice/Brix 12 | 18.0 | x | 7.0 | x | BP-4693 | Addition of acid | 0.3 | 4.0 |
| 1'-10 | Tomato juice/Brix 7 | 2.5 | x | 6.0 | x | BP-4693 | Addition of acid | 0.2 | 4.0 |
| Example 2' Series | | 2.5 | 0.2 to 20.0 | 6.0 | x | BP-4693 | Addition of acid | 0.2 | 4.0 |
| 2'-1 | Tomato juice/Brix 12 | 2.5 | 0.2 | 6.0 | x | BP-4693 | Addition of acid | 0.2 | 4.0 |
| 2'-2 | Tomato juice/Brix 12 | 2.5 | 3.0 | 6.0 | x | BP-4693 | Addition of acid | 0.2 | 4.0 |
| 2'-3 | Tomato juice/Brix 12 | 2.5 | 15.0 | 6.0 | x | BP-4693 | Addition of acid | 0.2 | 4.0 |
| 2'-4 | Tomato juice/Brix 12 | 2.5 | 20.0 | 6.0 | x | BP-4693 | Addition of acid | 0.2 | 4.0 |

TABLE 10

| Lot | Substrate | Conditions for Fermentation Medium ||||| Process ||| pH of medium after logarithmic growth phase |
| --- | --- | --- | --- | --- | --- | --- | --- | --- | --- |
| | | Fructose (%) | Milk (non-fat milk solid content) (%) | pH | Glu addition | Strain | pH reduction method | Rate of pH reduction (l/hour) | |
| Example 3' Series | | 2.5 | x | 6.0 | x | BP-4693 | Addition of acid | | 3.3 to 4.5 |
| 3'-1 | Tomato juice/Brix 12 | 2.5 | x | 6.0 | x | BP-4693 | Addition of acid | 0.25 (5 hours) → 0.1 (5 hours) | 3.3 |
| 3'-2 | Tomato juice/Brix 12 | 2.5 | x | 6.0 | x | BP-4693 | Addition of acid | 0.30 (5 hours) → 0.1 (5 hours) | 4.0 |
| 3'-3 | Tomato juice/Brix 12 | 2.5 | x | 6.0 | x | BP-4693 | Addition of acid | 0.30 (5 hours) → 0.2 (5 hours) | 4.5 |
| Example 4' Series | | 2.5 | 3.0 | 6.0 | x | BP-4693 | Addition of acid | | 3.3-4.5 |
| 4'-1 | Tomato juice/Brix 12 | 2.5 | 3.0 | 6.0 | x | BP-4693 | Addition of acid | 0.25 (5 hours) → 0.1 (5 hours) | 3.3 |
| 4'-2 | Tomato juice/Brix 12 | 2.5 | 3.0 | 6.0 | x | BP-4693 | Addition of acid | 0.30 (5 hours) → 0.1 (5 hours) | 4.0 |
| 4'-3 | Tomato juice/Brix 12 | 2.5 | 3.0 | 6.0 | x | BP-4693 | Addition of acid | 0.30 (5 hours) → 0.2 (5 hours) | 4.5 |
| Example 5' | Tomato juice/Brix 12 | 2.5 | x | 6.0 | x | BP-4693 | Coculturing | Refer to FIG. 6 | 4.46 |
| Example 6' | Tomato juice/Brix 12 | 2.5 | 3.0 | 6.0 | x | BP-4693 | Coculturing | Refer to FIG. 7 | 4.28 |
| Example 7' | Tomato juice/Brix 12 | 2.5 | x | 6.0 | x | JCM1059 | Addition of acid | 0.2 | 4.0 |
| Example 8' | Tomato juice/Brix 12 | 2.5 | 3.0 | 6.0 | x | JCM1059 | Addition of acid | 0.2 | 4.0 |
| Example 9' | Tomato juice/Brix 12 | 2.5 | x | 6.0 | x | JCM1059 | Coculturing | Refer to FIG. 8 | 4.51 |
| Example 10' | Tomato juice/Brix 12 | 2.5 | 3.0 | 6.0 | x | JCM1059 | Coculturing | Refer to FIG. 9 | 4.33 |

TABLE 11

| | Effects ||||
| --- | --- | --- | --- | --- |
| | Bacterial count immediately after termination of fermentation | Bacterial count after preservation | Sensory Evaluation after Preservation ||
| | | | Evaluation 1 | Evaluation 2 |
| Example 1' Series | | | | |
| 1'-1 | $5 \times 10^8$ | $5 \times 10^8$ | No significant difference | No significant difference compared to Example 1'-2 |
| 1'-2 | $5 \times 10^8$ | $5 \times 10^8$ | No significant difference | — |
| 1'-3 | $5 \times 10^8$ | $5 \times 10^8$ | No significant difference | No significant difference compared to Example 1'-2 |
| 1'-4 | $5 \times 10^8$ | $5 \times 10^8$ | No significant difference | No significant difference compared to Example 1'-5 |
| 1'-5 | $5 \times 10^8$ | $5 \times 10^8$ | No significant difference | — |
| 1'-6 | $5 \times 10^8$ | $5 \times 10^8$ | No significant difference | No significant difference compared to Example 1'-5 |
| 1'-7 | $5 \times 10^8$ | $5 \times 10^8$ | No significant difference | No significant difference compared to Example 1'-8 |
| 1'-8 | $5 \times 10^8$ | $5 \times 10^8$ | No significant difference | — |
| 1'-9 | $5 \times 10^8$ | $5 \times 10^8$ | No significant difference | No significant difference compared to Example 1'-8 |
| 1'-10 | $5 \times 10^8$ | $5 \times 10^8$ | No significant difference | — |
| Example 2' Series | | | | |
| 2'-1 | $1 \times 10^9$ | $1 \times 10^9$ | No significant difference | — |
| 2'-2 | $1 \times 10^9$ | $1 \times 10^9$ | No significant difference | — |
| 2'-3 | $7 \times 10^8$ | $7 \times 10^8$ | No significant difference | — |
| 2'-4 | $7 \times 10^8$ | $7 \times 10^8$ | No significant difference | — |

TABLE 11-continued

| | Effects | | | |
|---|---|---|---|---|
| | Bacterial count immediately after termination of fermentation | Bacterial count after preservation | Sensory Evaluation after Preservation | |
| | | | Evaluation 1 | Evaluation 2 |
| Example 3' Series | | | | |
| 3'-1 | $5 \times 10^8$ | $5 \times 10^8$ | No significant difference | — |
| 3'-2 | $5 \times 10^8$ | $5 \times 10^8$ | No significant difference | — |
| 3'-3 | $5 \times 10^8$ | $5 \times 10^8$ | No significant difference | — |
| Example 4' Series | | | | |
| 4'-1 | $5 \times 10^8$ | $5 \times 10^8$ | No significant difference | — |
| 4'-2 | $5 \times 10^8$ | $5 \times 10^8$ | No significant difference | — |
| 4'-3 | $5 \times 10^8$ | $5 \times 10^8$ | No significant difference | — |
| Example 5' | $5 \times 10^8$ | $5 \times 10^8$ | No significant difference | Significant difference compared to Example 1'-2 |
| Example 6' | $1 \times 10^9$ | $1 \times 10^9$ | No significant difference | Significant difference compared to Example 2'-2 |
| Example 7' | $1 \times 10^8$ | $1 \times 10^8$ | No significant difference | — |
| Example 8' | $5 \times 10^8$ | $5 \times 10^8$ | No significant difference | — |
| Example 9' | $1 \times 10^8$ | $1 \times 10^8$ | No significant difference | Significant difference compared to Example 7' |
| Example 10' | $5 \times 10^8$ | $5 \times 10^8$ | No significant difference | Significant difference compared to Example 8' |

TABLE 12

| | Process | | | | | | | | | |
|---|---|---|---|---|---|---|---|---|---|---|
| | Conditions for Fermentation Medium | | | | | | pH reduction method | Rate of pH reduction (l/hour) | pH of medium after logarithmic growth phase |
| Lot | Substrate | Fructose (%) | Milk (non-fat milk solid content) (%) | pH | Glu addition | Strain | | | |
| Comparative Example 1' Series | | 2.5 | | 5.0 to 7.0 | x | BP-4693 | None | — | 4.8 to 6.8 |
| 1'-1 | Tomato juice/Brix 12 | 2.5 | x | 5.0 | x | BP-4693 | None | — | 4.8 |
| 1'-2 | Tomato juice/Brix 12 | 2.5 | x | 6.0 | x | BP-4693 | None | — | 5.8 |
| 1'-3 | Tomato juice/Brix 12 | 2.5 | X | 7.0 | x | BP-4693 | None | — | 6.8 |
| Comparative Example 2' | Tomato juice/Brix 12 | 2.5 | x | 5.0 | x | BP-4693 | None | — | 4.0 |
| Comparative Example 3' | Tomato juice/Brix 12 | 2.5 | 3.0 | 6.0 | x | BP-4693 | None | — | 5.8 |
| Comparative Example 4' | | | x | | x | BP-4693 | Addition of acid | 0.2 | |
| Example 4' Series | | | | | | | | | |
| 4'-1 | Tomato juice/Brix 7 | 1.0 | x | 6.0 | x | BP-4693 | Addition of acid | 0.2 | 4.0 |
| 4'-2 | Tomato juice/Brix 12 | 25.0 | x | 6.0 | x | BP-4693 | Addition of acid | 0.2 | 3.8 |
| 4'-3 | Tomato juice/Brix 12 | 2.5 | x | 4.5 | x | BP-4693 | Addition of acid | 0.2 | 2.5 |
| 4'-4 | Tomato juice/Brix 12 | 2.5 | x | 7.5 | x | BP-4693 | Addition of acid | 0.2 | 5.5 |
| 4'-5 | Tomato juice/Brix 12 | 18.0 | x | 4.5 | x | BP-4693 | Addition of acid | 0.2 | 2.5 |
| 4'-6 | Tomato juice/Brix 12 | 18.0 | x | 7.5 | x | BP-4693 | Addition of acid | 0.2 | 5.5 |
| Comparative Example 5' | Tomato juice/Brix 12 | 2.5 | x | 6.0 | x | BP-4693 | Addition of acid | 0.4 | 2.0 |
| Comparative Example 6' | Tomato juice/Brix 12 | 2.5 | 3.0 | 6.0 | x | BP-4693 | Addition of acid | 0.4 | 2.0 |

TABLE 12-continued

| | Process | | | | | | | | |
|---|---|---|---|---|---|---|---|---|---|
| | Conditions for Fermentation Medium | | | | | | pH reduction method | Rate of pH reduction (1/hour) | pH of medium after logarithmic growth phase |
| Lot | Substrate | Fructose (%) | Milk (non-fat milk solid content) (%) | pH | Glu addition | Strain | | | |
| Comparative Example 7' | Tomato juice/Brix 12 | 2.5 | x | 6.0 | 0.3 | BP-4693 | Addition of acid | 0.2 | 4.0 |
| Comparative Example 8' | Tomato juice/Brix 12 | 2.5 | 3.0 | 6.0 | 0.3 | BP-4693 | Addition of acid | 0.2 | 4.0 |
| Comparative Example 9' | Tomato juice/Brix 12 | 2.5 | x | 6.0 | x | JCM1059 | None | — | 5.8 |
| Comparative Example 10' | Tomato juice/Brix 12 | 2.5 | 3.0 | 6.0 | x | JCM1059 | None | — | 5.8 |

TABLE 13

| | Effects | | | |
|---|---|---|---|---|
| | Bacterial count immediately after termination of fermentation | Bacterial count after preservation | Sensory Evaluation after Preservation | |
| | | | Evaluation 1 | Evaluation 2 |
| Comparative Example 1' Series | | | | |
| 1'-1 | $5 \times 10^8$ | $1 \times 10^9$ | Significant difference | Significant difference compared to Example 1'-1 |
| 1'-2 | $5 \times 10^8$ | $1 \times 10^9$ | Significant difference | Significant difference compared to Example 1'-2 |
| 1'-3 | $5 \times 10^8$ | $1 \times 10^9$ | Significant difference | Significant difference compared to Example 1'-3 |
| Comparative Example 2' | $5 \times 10^8$ | $5 \times 10^8$ | No significant difference | Significant difference compared to Example 1'-1 |
| Comparative Example 3' | $1 \times 10^9$ | $1 \times 10^9$ | Significant difference | Significant difference compared to Example 2'-2 |
| Comparative Example 4' Series | | | | |
| 4'-1 | $1 \times 10^7$ | $1 \times 10^7$ | No significant difference | Significant difference compared to Example 1'-10 |
| 4'-2 | $5 \times 10^8$ | $5 \times 10^8$ | No significant difference. | Significant difference compared to Example 1'-2 |
| 4'-3 | $1 \times 10^7$ | $1 \times 10^7$ | No significant difference | Significant difference compared to Example 1'-2 |
| 4'-4 | $1 \times 10^7$ | $1 \times 10^7$ | No significant difference | Significant difference compared to Example 1'-2 |
| 4'-5 | $1 \times 10^7$ | $1 \times 10^7$ | No significant difference | Significant difference compared to Example 1'-8 |
| 4'-6 | $1 \times 10^7$ | $1 \times 10^7$ | No significant difference | Significant difference compared to Example 1'-8 |
| Comparative Example 5' | $1 \times 10^7$ | $1 \times 10^7$ | No significant difference | Significant difference compared to Example 1'-2 |
| Comparative Example 6' | $1 \times 10^7$ | $1 \times 10^7$ | No significant difference | Significant difference compared to Example 2'-2 |
| Comparative Example 7' | $5 \times 10^8$ | $5 \times 10^8$ | No significant difference | Significant difference compared to Example 1'-2 |
| Comparative Example 8' | $1 \times 10^9$ | $1 \times 10^9$ | No significant difference | Significant difference compared to Example 2'-2 |
| Comparative Example 9' | $1 \times 10^8$ | $5 \times 10^8$ | Significant difference | Significant difference compared to Example 7' |
| Comparative Example 10' | $5 \times 10^8$ | $1 \times 10^9$ | Significant difference | Significant difference compared to Example 8' |

(2) Evaluation Results
(A) In Cases where Carrot Juice was Used as a Substrate

From the results of Examples 1-1 to 1-12, no significant differences in the results of the sensory evaluations were observed between the cryopreserved samples and the samples preserved at 10° C., in all cases.

In other words, if the malic acid content in the fermentation medium was 0.3 to 1.8% by mass and the pH of the fermentation medium was 5.0 to 7.0, no significant differences were present in the results of the sensory evaluations at any rate of the pH reduction between 0.1 and 0.3, and it was confirmed that all samples had favorable taste, flavor, and preservability.

On the other hand, from the results of Example 1-13, no significant differences in the results of the sensory evaluations were observed between the cryopreserved samples and the samples preserved at 10° C. in the case where the Brix was 7%.

From the results of Examples 2-1 to 2-4, no significant differences in the results of the sensory evaluations were observed between the cryopreserved samples and the samples preserved at 10° C. when the amount of milk added to the fermentation medium was changed within the range of 0.2 to 20.0% by mass, and it was confirmed that all samples had favorable taste, flavor, and preservability.

From the results of Examples 3-1 to 3-3, no significant differences in the results of the sensory evaluations were observed between the cryopreserved samples and the samples preserved at 10° C. even when the rate of the pH reduction was changed partway, if the pH of the fermentation medium was 5.0 to 7.0, and it was confirmed that all samples had favorable taste, flavor, and preservability.

From the results of Examples 4-1 to 4-3, no significant differences in the results of the sensory evaluations were observed between the cryopreserved samples and the samples preserved at 10° C. even when 3.0% by mass of milk was added to the fermentation medium and the rate of the pH reduction was changed partway, and it was confirmed that all samples had favorable taste, flavor, and preservability.

From the results of Examples 5 and 6, no significant differences in the results of the sensory evaluations were observed between the cryopreserved samples and the samples preserved at 10° C. without depending on the addition of milk to the fermentation medium, when the pH was reduced during the fermentation by coculturing with *Lactobacillus pentosus* strain BP-10958. Thus, it was confirmed that all samples had favorable taste, flavor, and preservability.

Moreover, it was confirmed that the samples of Example 5 as compared to those of Example 1-2, and the samples of Example 6 as compared to those of Example 2-2, had superior taste and flavor with a given fermentation savor, and were more favorable in terms of sensuality. That is, it was shown that the pH reduction by coculturing with *Lactobacillus pentosus* strain BP-10958 was effective to improve the taste of fermented food or drink products.

From the results of Examples 7 and 8, no significant differences in the results of the sensory evaluations were observed between the cryopreserved samples and the samples preserved at 10° C. without depending on the addition of milk to the fermentation medium, when the fermentation was carried out using *Lactobacillus brevis* strain JCM1059. Thus, it was confirmed that all samples had favorable taste, flavor, and preservability.

From the results of Examples 9 and 10, no significant differences in the results of the sensory evaluations were observed between the cryopreserved samples and the samples preserved at 10° C. without depending on the addition of milk to the fermentation medium, when *Lactobacillus brevis* strain JCM1059 was used and the pH was reduced during the fermentation by coculturing with *Lactobacillus pentosus* strain BP-10958. Thus, it was confirmed that all samples had favorable taste, flavor, and preservability.

Moreover, it was confirmed that the samples of Example 9 as compared to those of Example 7, and the samples of Example 10 as compared to those of Example 8, had superior taste and flavor with a given fermentation savor, and were more favorable in terms of sensuality. In other words, it was shown that the pH reduction by coculturing with *Lactobacillus pentosus* strain BP-10958 was effective to improve the taste of fermented food or drink products.

Significant differences in the results of the sensory evaluations were observed between the cryopreserved samples and the samples preserved at 10° C., in all cases of Comparative Examples 1-1 to 1-3. It is apparent from the viable bacterial counts immediately after the fermentation and after the preservation that the significant differences was caused by continuation of the fermentation process during the preservation.

Moreover, significant differences in the results of the sensory evaluations were observed between respective samples of Comparative Example 1-1 vs. Example 1-1, Comparative Example 1-2 vs. Example 1-2, and Comparative Example 1-3 vs. Example 1-3, in all cases. All samples of Comparative Examples 1-1 to 1-3 were unsatisfactory in terms of the taste and flavor.

These results were caused by the excessively high pH at the termination time of the logarithmic growth phase, since the pH was not reduced during the fermentation in Comparative Examples 1-1 to 1-3.

No significant differences in the results of the sensory evaluations of Comparative Example 2 were observed between the cryopreserved samples and the samples preserved at 10° C., whereas the samples of Comparative Example 2 showed significant differences from those of Example 1-1 in the results of the sensory evaluations, and had already been unsatisfactory in terms of taste and flavor at the stage immediately after the fermentation. This was due to the high fermentation degree of the fermented vegetative liquid caused by failing the pH reduction during the fermentation.

Significant differences in the results of the sensory evaluations of Comparative Example 3 were observed between the cryopreserved samples and the samples preserved at 10° C. This was because the fermentation continued to proceed during the preservation.

In addition, the samples of Comparative Example 3 showed significant differences from those of Example 2-2 in the results of the sensory evaluations, and were unsatisfactory in terms of taste and flavor.

These results were considered to be due to the excessively high pH at the termination time of the logarithmic growth phase, caused by failing the pH reduction during the fermentation in Comparative Example 3.

No significant differences in the results of the sensory evaluations of Comparative Examples 4-1 to 4-6 were observed between the cryopreserved samples and the samples preserved at 10° C., in all cases. However, significant differences in the results of the sensory evaluations were observed between respective samples of Comparative Example 4-1 vs. Example 1-13, Comparative Examples 4-2 to 4-4 vs. Example 1-2, and Comparative Examples 4-5 and 4-6 vs. Example 1-11, in all cases. That is, all samples of Comparative Examples 4-1 to 4-6 had already been unsatisfactory in terms of taste and flavor, at the stage prior to preservation.

In Comparative Example 4-1, it is apparent from the viable bacterial count immediately after the fermentation that the results were due to the low fermentation degree caused by the low content of malic acid.

In Comparative Example 4-2, the results were due to a larger amount of salt byproduct resulted from a larger amount of potassium carbonate used for adjusting the pH of the fermentation medium prior to the fermentation, since the malic acid content was high.

In Comparative Examples 4-3 and 4-5, it is apparent from the viable bacterial count immediately after the fermentation that the results were caused by a low degree of fermentation due to the low pH of the fermentation medium prior to the fermentation.

In Comparative Examples 4-4 and 4-6, it is apparent from the viable bacterial count immediately after fermentation that the results were caused by a low degree of fermentation due to the high pH of the fermentation medium prior to the fermentation, and, in addition, by a larger amount of salt byproduct resulted from a larger amount of potassium carbonate used for adjusting the pH prior to the fermentation and a larger amount of citric acid used for reducing the pH during the fermentation.

No significant differences in the results of the sensory evaluations of Comparative Examples 5 and 6 were observed between the cryopreserved samples and the samples preserved at 10° C. However, the samples of Comparative Example 5 showed significant differences from those of Example 1-2, and the samples of Comparative Example 6 showed significant differences from those of Example 2-2 in the results of the sensory evaluations, and had already been unsatisfactory in terms of taste and flavor, at the stage prior to the preservation.

It is apparent from the viable bacterial count immediately after the fermentation that the results were due to the low fermentation degree caused by an excessive pH reduction at the termination time of the logarithmic growth phase, resulted from the excessively high rate of the pH reduction, without depending on the addition of milk to the fermentation medium.

No significant differences in the results of the sensory evaluations of Comparative Examples 7 and 8 were observed between the cryopreserved samples and the samples preserved at 10° C., in all cases. However, the samples of Comparative Example 7 showed significant differences from those of Example 1-2, and the samples of Comparative Example 8 showed significant differences from those of Example 2-2 in the results of the sensory evaluations, and had already been unsatisfactory in terms of taste and flavor, at the stage prior to preservation.

This was caused by the remaining glutamic acid in the fermented vegetative liquid which had been added to the fermentation medium, and by the production of γ-amino lactic acid (GABA) by Lactobacillus brevis strain BP-4693 during the fermentation, regardless of the addition of milk to the fermentation medium.

Regarding the samples of Comparative Example 9 and Comparative Example 10, significant differences in the results of the sensory evaluations were observed between the cryopreserved samples and the samples preserved at 10° C., in all cases. As is apparent from the viable bacterial counts immediately after the fermentation and after the preservation, this was because the fermentation continued to proceed during the preservation. Moreover, the samples of Comparative Example 9 showed significant differences from those of Example 7, and the samples of Comparative Example 10 showed significant differences from those of Example 8 in the results of the sensory evaluations, and were unsatisfactory in terms of taste and flavor.

This was caused by failing the pH reduction during the fermentation, which resulted in the excessively high pH at the termination time of the logarithmic growth phase, regardless of the addition of milk to the fermentation medium, even when Lactobacillus brevis strain JCM1059 was used.

(B) In Cases where Tomato Juice was Used as a Substrate.

From the results of Examples 1'-1 to 1'-9, no significant differences in the results of the sensory evaluations were observed between the cryopreserved samples and the samples preserved at 10° C., in all cases.

In other words, no significant differences were present in the results of the sensory evaluations at any rate of the pH reduction between 0.1 and 0.3, if the fructose content in the fermentation medium was 2.0 to 20.0% by mass and the pH of the fermentation medium was 5.0 to 7.0, and it was confirmed that all samples had favorable taste, flavor, and preservability.

On the other hand, from the results of Example 1'-10, no significant differences in the results of the sensory evaluations were observed between the cryopreserved samples and the samples preserved at 10° C. in the case where the Brix was 7%.

From the results of Examples 2'-1 to 2'-4, no significant differences in the results of the sensory evaluations were observed between the cryopreserved samples and the samples preserved at 10° C. when the amount of milk added to the fermentation medium was changed within the range of 0.2 to 20.0% by mass, and it was confirmed that all samples had favorable taste, flavor, and preservability.

From the results of Examples 3'-1 to 3'-3, no significant differences in the results of the sensory evaluations were observed between the cryopreserved samples and the samples preserved at 10° C. even when the rate of the pH reduction was changed partway, and it was confirmed that all samples had excellent taste, flavor, and preservability.

From the results of Examples 4'-1 to 4'-3, no significant differences in the results of the sensory evaluations were observed between the cryopreserved samples and the samples preserved at 10° C., even when 3.0% by mass of milk was added to the fermentation medium and the rate of the pH reduction was changed partway, and it was confirmed that all samples had favorable taste, flavor, and preservability.

From the results of Examples 5' and 6', no significant differences in the results of the sensory evaluations were observed between the cryopreserved samples and the samples preserved at 10° C. when the pH was reduced during the fermentation by coculturing with Lactobacillus pentosus strain BP-10958, regardless of the addition of milk to the fermentation medium, and it was confirmed that all samples had favorable taste, flavor, and preservability.

Moreover, it was confirmed that the samples of Example 5' as compared to those of Example 1'-2, and the samples of Example 6' as compared to those of Example 2'-2, had superior taste and flavor with a given fermentation savor, and were more favorable in terms of sensuality. That is, it was shown that the pH reduction by coculturing with Lactobacillus pentosus strain BP-10958 was effective to improve the taste of fermented food or drink products.

From the results of Examples 7' and 8', no significant differences in the results of the sensory evaluations were observed between the cryopreserved samples and the samples preserved at 10° C. when the fermentation was carried out using Lactobacillus brevis strain JCM1059, regardless of the addition of milk to the fermentation medium, and it was confirmed that all samples had favorable taste, flavor, and preservability.

From the results of Examples 9' and 10', no significant differences in the results of the sensory evaluations were observed between the cryopreserved samples and the samples preserved at 10° C. when *Lactobacillus brevis* strain JCM1059 was used and when the pH was reduced during the fermentation by coculturing with *Lactobacillus pentosus* strain BP-10958, regardless of the addition of milk to the fermentation medium, and it was confirmed that all samples had favorable taste, flavor, and preservability.

Moreover, it was confirmed that the samples of Example 9' as compared to those of Example 7', and the samples of Example 10' as compared to those of Example 8', had superior taste and flavor with a given fermentation savor, and were more favorable in terms of sensuality. That is, it was shown that the pH reduction by coculturing with *Lactobacillus pentosus* strain BP-10958 was effective to improve the taste of fermented food or drink products.

Regarding the samples of Comparative Examples 1'-1 to 1'-3, significant differences in the results of the sensory evaluations were observed between the cryopreserved samples and the samples preserved at 10° C., in all cases. As is apparent from the viable bacterial counts immediately after the fermentation and after the preservation, this was because the fermentation continued to proceed during the preservation.

Moreover, significant differences in the results of the sensory evaluations were observed between respective samples of Comparative Example l'-1 vs. Example 1'-1, Comparative Example 1'-2 vs. Example 1'-2, and Comparative Example l'-3 vs. Example l'-3, in all cases. All samples of Comparative Examples 1'-1 to 1'-3 were unsatisfactory in terms of taste and flavor.

These results were caused by the excessively high pH at the termination time of the logarithmic growth phase, the excessively high pH being caused by failing the pH reduction during the fermentation in Comparative Examples 1'-1 to 1'-3.

Regarding the samples of Comparative Example 2', no significant differences in the results of the sensory evaluations were observed between the cryopreserved samples and the samples preserved at 10° C., whereas the samples of Comparative Example 2' showed significant differences from those of Example 1'-1 in the results of the sensory evaluations, and had already been unsatisfactory in terms of taste and flavor, at the stage immediately after the fermentation. This was due to the high fermentation degree of the fermented vegetative liquid, the high fermentation degree being caused by failing the pH reduction during the fermentation.

Regarding the samples of Comparative Example 3', significant differences in the results of the sensory evaluations were observed between the cryopreserved samples and the samples preserved at 10° C. This was because the fermentation continued to proceed during the preservation.

Moreover, the samples of Comparative Example 3' showed significant differences from those of Example 2'-2 in the results of the sensory evaluations, and were unsatisfactory in terms of taste and flavor.

These results were considered to be caused by the excessively high pH at the termination time of the logarithmic growth phase, the excessively high pH being caused by failing the pH reduction during the fermentation in Comparative Example 3'.

Regarding the samples of Comparative Examples 4'-1 to 4'-6, no significant differences in the results of the sensory evaluations were observed between the cryopreserved samples and the samples preserved at 10° C., in all cases. However, significant differences in the results of the sensory evaluations were observed between respective samples of Comparative Example 4'-1 vs. Example 1'-10, Comparative Examples 4'-2 to 4'-4 vs. Example 1'-2, and Comparative Examples 4'-5 and 4'-6 vs. Example 1'-8, in all cases. That is, all samples of Comparative Examples 4'-1 to 4'-6 had already been unsatisfactory in terms of taste and flavor, at the stage prior to the preservation.

In Comparative Example 4'-1, as is apparent from the viable bacterial count immediately after the fermentation, the results were caused by the low degree of fermentation due to the low content of the fructose.

In Comparative Example 4'-2, the results were caused by the excessively strong sweetness due to the high content of the fructose.

In Comparative Examples 4'-3 and 4'-5, as is apparent from the viable bacterial count immediately after the fermentation, the results were caused by the low degree of fermentation due to the low pH of the fermentation medium prior to the fermentation.

In Comparative Examples 4'-4 and 4'-6, as is apparent from the viable bacterial count immediately after the fermentation, the results were due to the low fermentation degree, the low fermentation degree being due to the high pH of the fermentation medium prior to the fermentation, and, in addition, due to the larger amount of salt byproduct resulted from both a larger amount of potassium carbonate used for adjusting the pH prior to the fermentation and a larger amount of citric acid used for reducing the pH during the fermentation.

Regarding the samples of Comparative Example 5' and Comparative Example 6', no significant differences in the results of the sensory evaluations were observed between the cryopreserved samples and the samples preserved at 10° C., in all cases. However, the samples of Comparative Example 5' showed significant differences from those of Example l'-2, and the samples of Comparative Example 6' showed significant differences from those of Example 2'-2 in the results of the sensory evaluations, and had already been unsatisfactory in terms of taste and flavor, at the stage prior to the preservation.

As is apparent from the viable bacterial count immediately after the fermentation, the results was due to the low fermentation degree caused by excessively lowered pH at the termination time of the logarithmic growth phase resulted from the excessively high rate of the pH reduction, regardless of the addition of milk to the fermentation medium.

Regarding the samples of Comparative Example 7' and Comparative Example 8', no significant differences in the results of the sensory evaluations were observed between the cryopreserved samples and the samples preserved at 10° C., in all cases. However, the samples of Comparative Example 7' showed significant differences from those of Example 1'-2, and the samples of Comparative Example 8' showed significant differences from those of Example 2'-2 in the results of the sensory evaluations, and had already been unsatisfactory in terms of taste and flavor, at the stage prior to the preservation.

The results were caused by the remaining glutamic acid in the fermented vegetative liquid which had been added to the fermentation medium, and by the production of γ-amino lactic acid (GABA) by *Lactobacillus brevis* strain BP-4693 during the fermentation, regardless of the addition of milk to the fermentation medium.

Regarding the samples of Comparative Example 9' and Comparative Example 10', significant differences in the results of the sensory evaluations were observed between the cryopreserved samples and the samples preserved at 10° C., in all cases. As is apparent from the viable bacterial counts immediately after the fermentation and after the preservation, this was because the fermentation continued to proceed during the preservation. Moreover, in the results of the sensory evaluations, the samples of Comparative Example 9' showed significant differences from those of Example 7', and the samples of Comparative Example 10' showed significant differences from those of Example 8', and were unsatisfactory in terms of taste and flavor.

The results were due to the excessively high pH at the termination time of the logarithmic growth phase, the excessively high pH being caused by failing the pH reduction during the fermentation, regardless of the addition of milk to the fermentation medium, even when *Lactobacillus brevis* strain JCM1059 was used.

From the above results, it was confirmed that fermented food or drink products produced in accordance with the production method according to the present invention have favorable taste and flavor, and are hardly deteriorated even after preservation at 10° C. for 3 weeks.

As described above, the present invention can provide fermented food or drink products designed for health which have favorable taste, flavor, and preservability, and which contain viable lactic acid bacteria.

performing fermentation at least until the termination of the logarithmic growth phase of the first strain of lactic acid bacteria;

adding at least one of an acid or a second strain of lactic acid-producing bacteria to the medium at any point in time from the initiation of the fermentation until the termination of the logarithmic growth phase, so as to perform the fermentation with a rate of pH reduction of the medium being 0.01 to 0.3 (1/hour) from the initiation of the fermentation until the termination of the logarithmic growth phase, and continuing fermentation until the medium has a pH of 3.3 to 4.6.

2. The method for producing a fermented food or drink product according to claim 1, wherein the first strain of lactic acid bacteria is *Lactobacillus brevis* strain FERM BP-4693.

3. The method for producing a fermented food or drink product according to claim 1, wherein the second strain of lactic acid-producing bacteria is *Lactobacillus pentosus* strain FERM BP-10958.

4. The method for producing a fermented food or drink product according to claim 1, wherein a temperature of the fermented food or drink product is lowered after the completion of the fermentation.

What is claimed is:

1. A method for producing a fermented food or drink product, comprising:

adding a first strain of lactic acid bacteria that belongs to *Lactobacillus brevis* to a medium comprising 50% or more by mass of a vegetative raw material, the content of the vegetative raw material being determined based on its mass in a natural state, and either 0.2 to 2.0% by mass of malic acid or 2.0 to 20.0% by mass of fructose, the medium having a pH of 5.0 to 7.0;

5. The method for producing a fermented food or drink product according to claim 1, wherein the medium comprises 0.1 to 20% by mass, as a non-fat milk solid content, of milk.

6. The method for producing a fermented food or drink product according to claim 1, wherein the medium comprises 0.2 to 0.45% by mass of malic acid.

7. A fermented food or drink product obtained by the method of claim 1.

8. The fermented food or drink product according to claim 7, being a feed for animals.

9. The method for producing a fermented food or drink product according to claim 2, wherein the second strain of lactic acid-producing bacteria is *Lactobacillus pentosus* strain FERM BP-10958.

10. The method of claim 1, wherein the step of adding at least one of an acid or a second strain of lactic acid-producing bacteria includes adding the second strain of lactic acid-producing bacteria.

11. The method of claim 1, wherein the step of adding at least one of an acid or a second strain of lactic acid-producing bacteria includes adding the acid.

12. The method of claim 1, wherein the step of adding at least one of an acid or a second strain of lactic acid-producing bacteria includes adding both the acid and the second strain of lactic acid-producing bacteria.

13. The method of claim 1, wherein an acid or a second strain of lactic acid-producing bacteria are added a plurality of times.

* * * * *